United States Patent
Faulkner et al.

(10) Patent No.: US 10,038,877 B1
(45) Date of Patent: Jul. 31, 2018

(54) EVENT CONDITIONED VIEWS FOR TELECONFERENCING SESSIONS

(71) Applicant: Microsoft Technology Licensing, LLC, Redmond, WA (US)

(72) Inventors: Jason Thomas Faulkner, Seattle, WA (US); Ekaterina Bassova, Sammamish, WA (US); Thaddeus A. Scott, Kirkland, WA (US); Marcelo Daniel Truffat, Bothell, WA (US); Mansoor Malik, Redmond, WA (US); Matthew Benjamin Blank, Redmond, WA (US); Kevin D. Morrison, Arlington, MA (US); Timothy Michael Cleary, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/457,995

(22) Filed: Mar. 13, 2017

(51) Int. Cl.
*H04N 7/15* (2006.01)
*H04N 5/445* (2011.01)
*H04N 5/44* (2011.01)

(52) U.S. Cl.
CPC ............ *H04N 7/15* (2013.01); *H04N 5/4403* (2013.01); *H04N 5/44591* (2013.01)

(58) Field of Classification Search
CPC combination set(s) only.
See application file for complete search history.

(56) References Cited

U.S. PATENT DOCUMENTS

| 2003/0037112 A1* | 2/2003 | Fitzpatrick .......... H04L 12/1813 709/205 |
| 2005/0231588 A1* | 10/2005 | Yang .................... H04L 12/1813 348/14.08 |
| 2012/0062688 A1 | 3/2012 | Shen et al. |

(Continued)

FOREIGN PATENT DOCUMENTS

| WO | 2012049320 A1 | 4/2012 |
| WO | 2016168154 A1 | 10/2016 |

OTHER PUBLICATIONS

"RealPresence Mobile—Tablet", https://play.google.com/store/apps/details?id=com.polycom.cmad.mobile.android &feature=search_result, Retrieved on: Feb. 28, 2017, 6 pages.

(Continued)

*Primary Examiner* — Joseph J Nguyen
(74) *Attorney, Agent, or Firm* — Scott Y. Shigeta; Newport IP, LLC

(57) ABSTRACT

Systems and methods for displaying a teleconference session are described. Teleconference data including display streams is transmitted to a number of client computers. Each of the streams may include at least a video and an audio component. A user interface includes a first display area rendering a first stream and a second display area rendering a second stream. An event may occur that removes a video component from the first stream. In response to the event, the rendering of the first stream may be removed from the first display area, and one or more streams of the plurality of streams may be displayed in at least a portion of the first display area. Such techniques for modifying user interface displays based on the actions of select users that have transitioned to an audio-only mode can optimize the use of a display area.

20 Claims, 15 Drawing Sheets

(56) References Cited

U.S. PATENT DOCUMENTS

| | | | |
|---|---|---|---|
| 2013/0242030 A1* | 9/2013 | Kato | H04L 65/403 348/14.07 |
| 2015/0077502 A1 | 3/2015 | Jordan et al. | |
| 2016/0021336 A1 | 1/2016 | Abbott et al. | |
| 2017/0111613 A1* | 4/2017 | Whynot | H04N 7/152 |

OTHER PUBLICATIONS

"Polycom RealPresence Desktop for Windows", http://downloads.polycom.com/video/realpresence_desktop/rpd_ug36_us_win.pdf, Published on: Jun. 2016, 50 pages.

Martin, Tim, "Skype for Business (Microsoft Lync)", https://uncoit.atlassian.net/wiki/pages/viewpage.action?pageId=30081142, Published on: Dec. 8, 2016, 44 pages.

"TrueConf 7.1.0 Beta for Windows", https://trueconf.com/downloads/windows-beta.html, Published on: Apr. 18, 2016, 6 pages.

"Getting Started Guide", https://www.bluejeans.com/sites/default/files/pdf/GettingStartedGuide-2.3.4.pdf, Published on: Nov. 25, 2013, 50 pages.

Downing, et al., "What's new in IBM Sametime 9 Audio and Video", https://www-10.lotus.com/ldd/stwiki.nsf/dx/Whatapos_new_in_Sametime_9_Audio_Video, Published on: Oct. 6, 2014, 21 pages.

"International Search Report and Written Opinion Issued in PCT Application No. PCT/US2018/021239", dated May 14, 2018, 11 Pages.

* cited by examiner

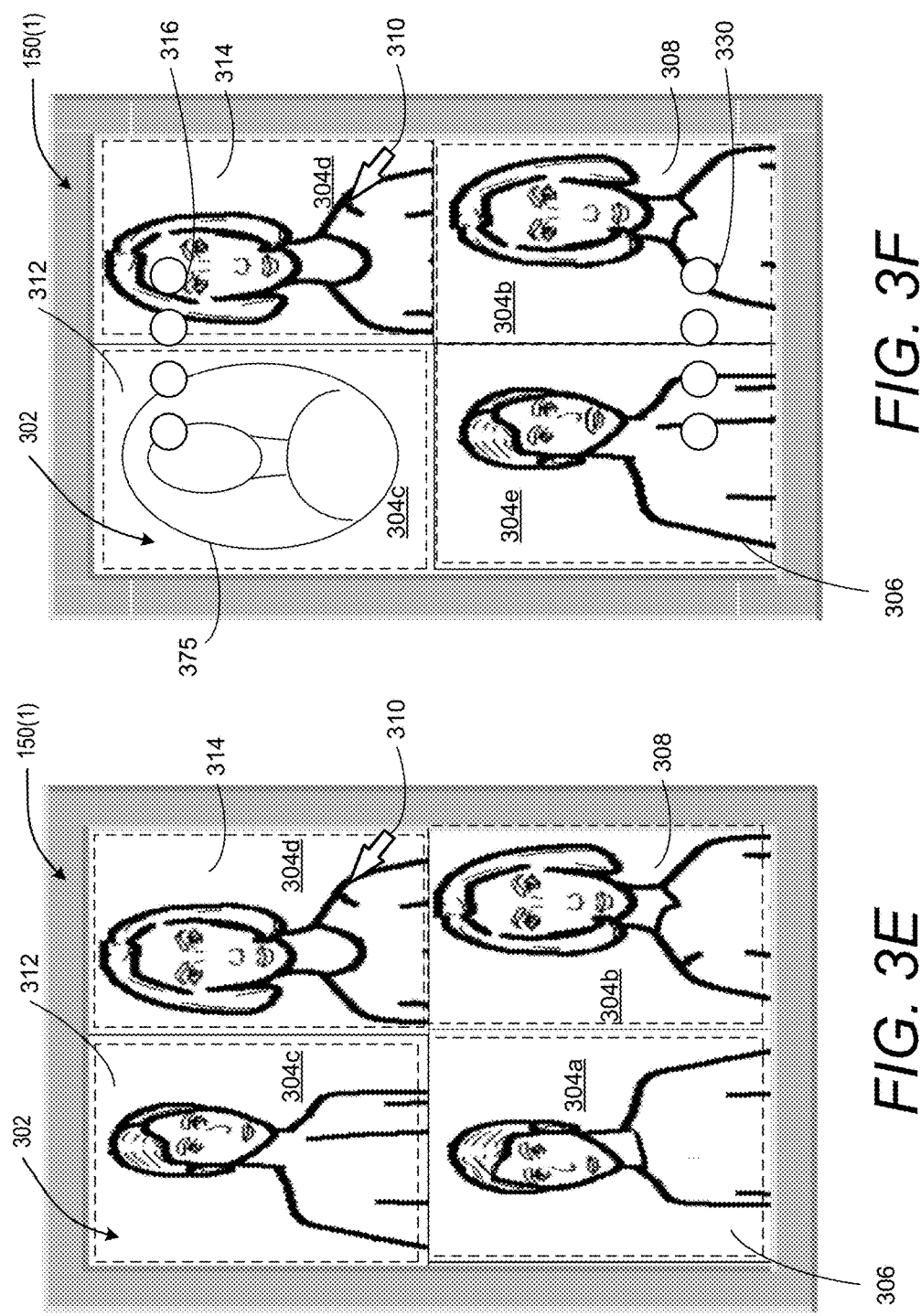

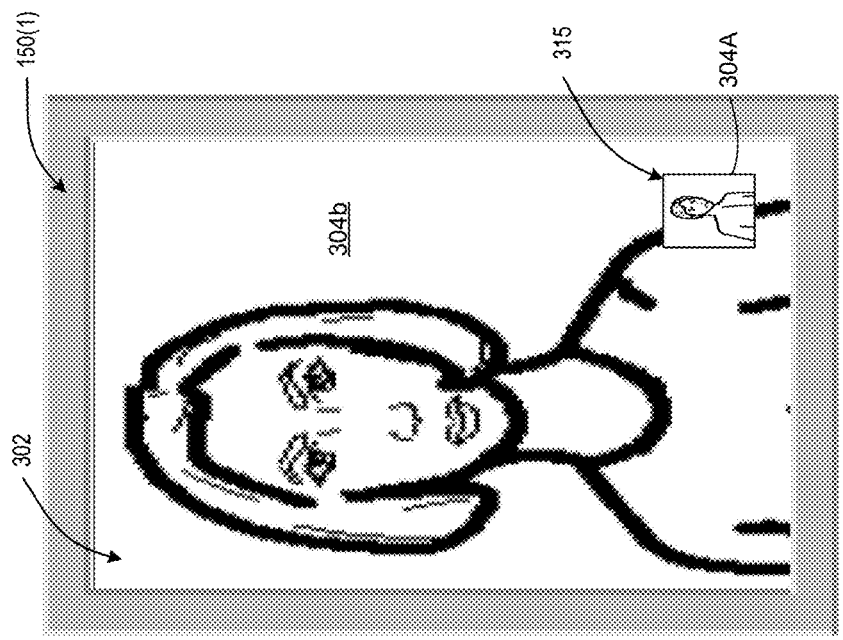

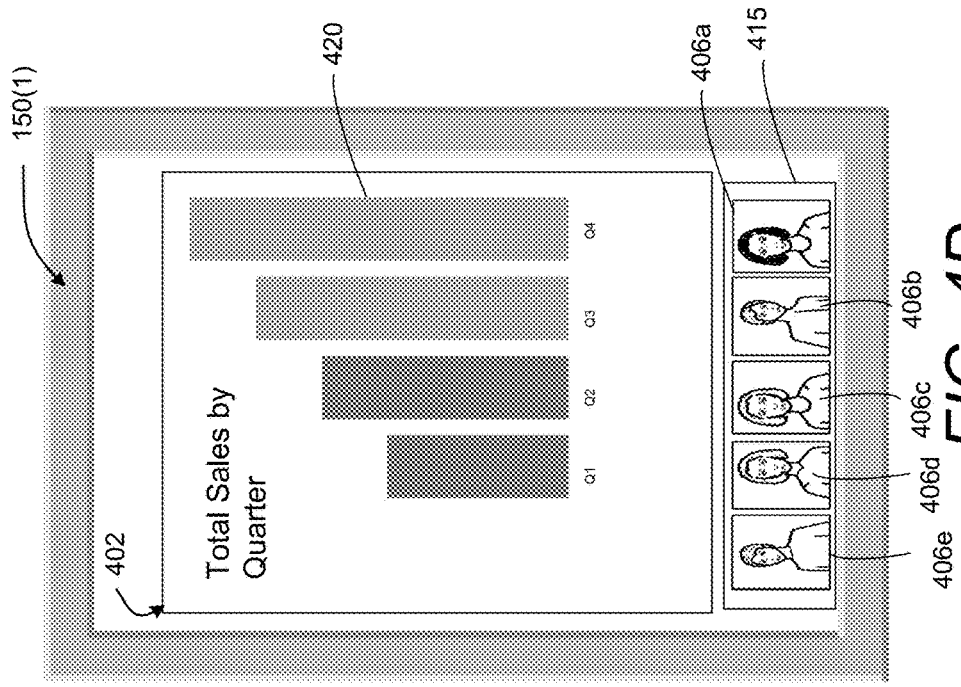
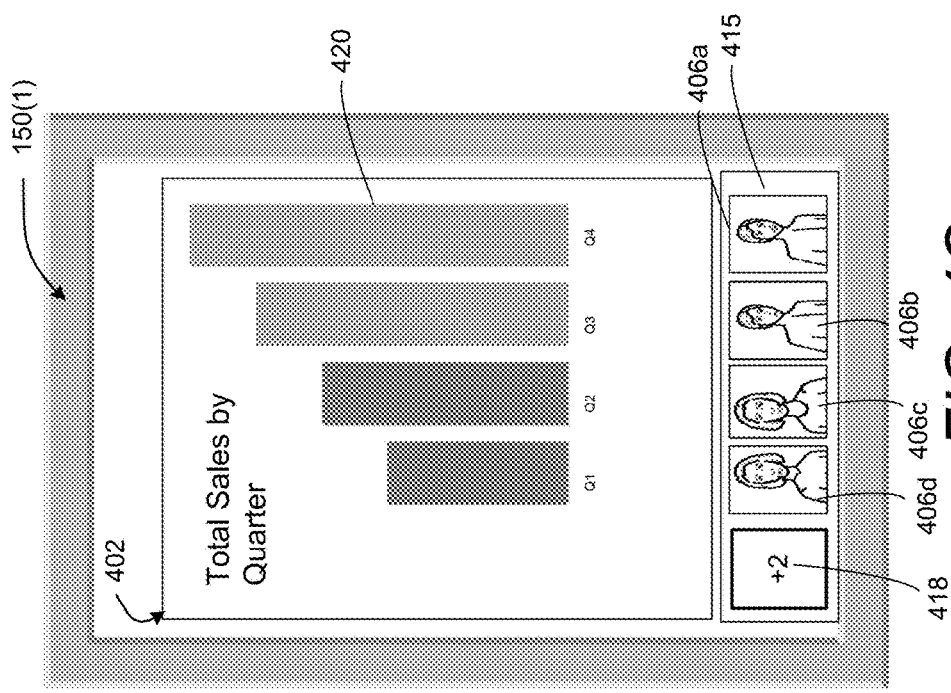

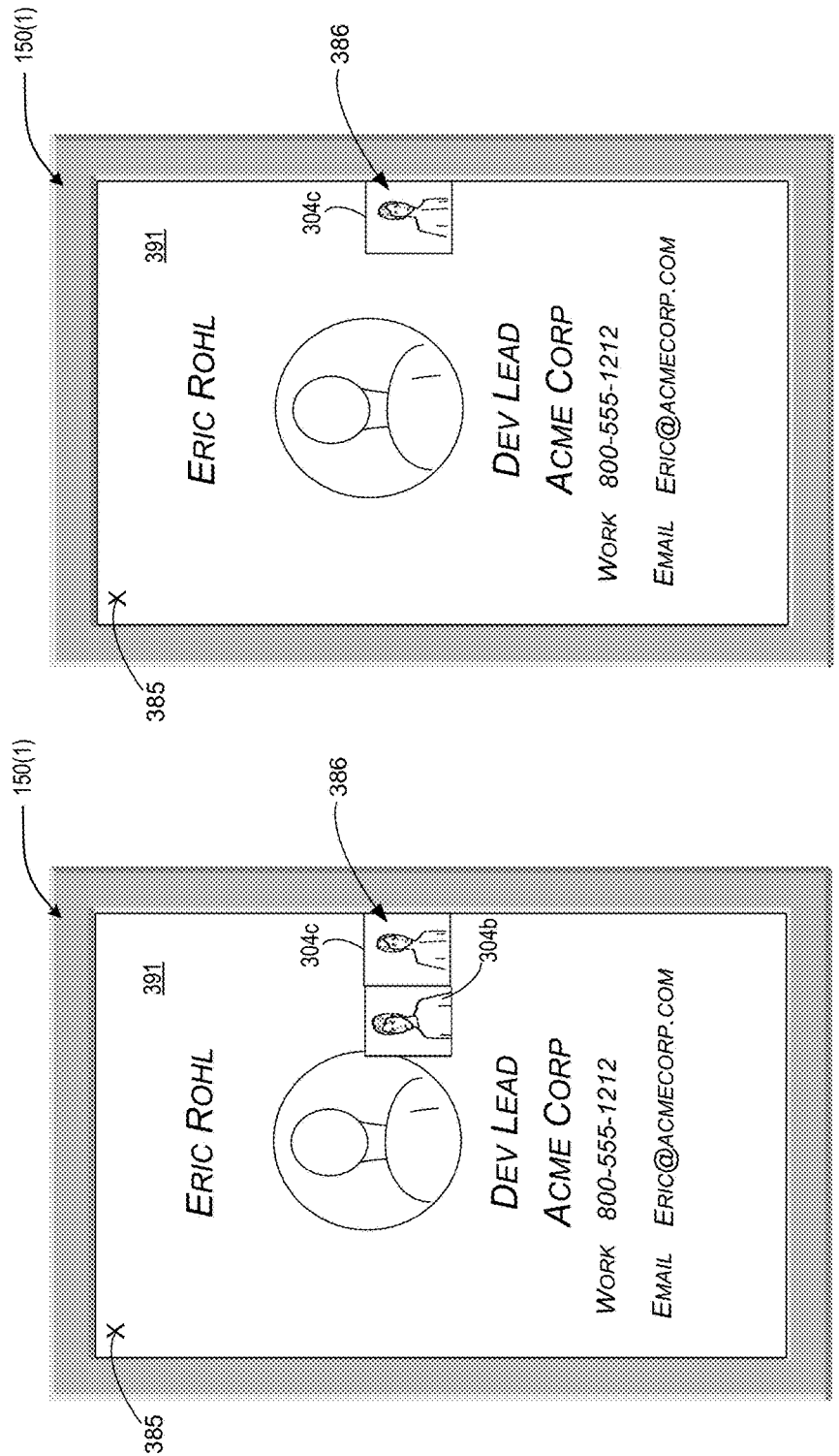

EVENT CONDITIONED VIEWS FOR TELECONFERENCING SESSIONS

BACKGROUND

The use of teleconference systems in commercial and corporate settings has increased in facilitating meetings and conferences between people in remote locations, reducing the need for travel so as to bring these people physically together in order to conduct the meetings or conferences. In general, teleconference systems allow users (i.e., people) of a teleconference system, in two or more remote locations, to communicate interactively with each other via live, simultaneous two-way video streams, audio streams, or both. Some teleconference systems (such as, for example, Cisco WebEx provided by Cisco Systems, Inc. of San Jose, Calif., GoToMeeting provided by Citrix Systems, Inc. of Santa Clara, Calif., Zoom provided by Zoom Video Communications of San Jose, Calif., Google Hangouts by Alphabet Inc. of Mountain View, Calif., and Skype for Business provided by Microsoft Corporation, of Redmond, Wash.) also allow users to exchange digital documents such as, for example, images, text, video and any others.

Most teleconference systems utilize remote communication devices (such as, for example, video terminals, personal computers (both desktop and portable) and mobile devices such as, for example, tablets, smartphones, etc.) that display video and play audio from the meeting, or conference, on a video display that may vary in size based on the type of communication devices or video display being utilized. As a result, the remote users of the teleconference system are typically limited to viewing the interactions of the meeting, or conference, through a "window" of the meeting, or conference, produced by the video display, which may be the screen of a mobile device, computer monitor, or large video display.

This results in a user interface that produces a fixed experience for the remote users of the teleconference system attending the meeting or conference. That is, some user interfaces only allow users to see framed individuals (i.e., images of other people participating in a meeting) in a gallery experience with a lot of negative space in the user interface that is not engaging for the remote users. Furthermore, the individually framed images utilized by conventional user interfaces are not rendered dynamically, which adds to the fixed experience for the remote users attending the meeting or conference. Moreover, in some teleconference systems, remote users may see multiple displays of fixed streams of data on their video displays with very few options for allowing individual remote users to customize their views to see important or salient activity of a teleconference session. Furthermore, those teleconference systems do not dynamically customize the views based on content associated with the streams of data.

As such, there is a need for an improved teleconference system that addresses these and other issues. It is with respect to these and other considerations that the disclosure made herein is presented.

SUMMARY

The techniques disclosed herein provide event conditioned views for teleconferencing sessions. The techniques disclosed herein optimize the use of a display screen during teleconference sessions. A participant may participate in a teleconference session, sharing a teleconference session feed including audio and video with others. When the participant stops sharing his or her video feed, and only communicates an audio feed, a client displaying video streams for that participant can automatically reconfigure a user interface to replace the rendering of the participant that stopped sharing his or her video feed with streams of other participants. In some configurations, the rendering of the teleconference session feed of the participant is replaced with one or more teleconference session feeds of people or content that are selected based on an activity level. In some configurations, a rendering of the teleconference session feed of the participant transitioning to an audio-only share is only replaced when the teleconference session feed includes at least a video feed or content of the participant. Furthermore, in some configurations, a rendering of the teleconference session feed of the participant transitioning to an audio-only share is only replaced when the rendering of the teleconference session feed includes a video feed or content of the participant and when the participant's teleconference session feed is being generated by or originates from a computing device being used by the participant. As will be described in more detail below, this feature is referred to as the removal of the "ME" display. Embodiments utilizing such features replace the "ME" display with other content or people of a teleconference session.

In an illustrative example, a teleconference session may be displayed in a user interface arrangement on a client computing device. The user interface arrangement may include a first display area and a second display area. A first stream of teleconference data may be displayed in the first display area and a second stream of teleconference data may be displayed in the second display area. An event may occur that removes a video component from the first stream of the teleconference data. In response to the event, the first stream of the teleconference data is removed from the first display area, and one or more streams is then rendered in the first display area. In some implementations, the first stream of the teleconference data is provided by the client computing device displayed in the user interface. Therefore, the described techniques provide a user interface arrangement that dynamically arranges streams of teleconference data based on one or more events. Dynamically arranging streams of teleconference data based on one or more events may enhance a user's experience of the teleconference session.

In one illustrative example, a teleconference session may be displayed in a user interface arrangement on a client computing device. The user interface arrangement may include a first display area rendering a first stream of teleconference data and a second display area rendering a second stream of teleconference data. An event may remove a video component from the first stream of teleconference data. In response to the event, the first stream may be removed from the first display area. One or more streams including video and audio components may replace the first stream that was removed from the first display area. In some implementations, the one or more streams including video components can be rendered in at least a portion of the first display area. Audio components associated with the one or more streams can be communicated to an output device, such as a speaker.

In some implementations, a plurality of streams including teleconference data may be transmitted to a client computing device. The client computing device may be caused to display a user interface arrangement including a first display area and a second display area. A first stream of the plurality of streams may be rendered in the first display area, and a second stream of the plurality of streams may be rendered in the second display area. An event may remove a video component from the first stream of teleconference data. The first stream of teleconference data may subsequently be removed from the first display area in response to the event. In some implementations, in response to the event, the user interface arrangement may be rearranged such that the second stream is rendered in at least a portion of the first display area. Furthermore, in some implementations, in response to the event, a third stream of the plurality of streams may be rendered in a third display area. The third stream may include an audio component or video and audio components. Additionally, in some implementations, the first stream includes teleconference data generated by the client computing device.

In some embodiments, media streams are received from a plurality of client computing devices at a server. The media streams are combined by the server to generate teleconference data defining aspects of a teleconference session. The teleconference data can comprise individual data streams, also referred to herein as "streams," which can comprise content streams or participant streams. The participant streams include video of one or more participants. The content streams may include video or images of files, data structures, word processing documents, formatted documents (e.g. PDF documents), spreadsheets, or presentations. The content streams include all streams that are not participant streams. In some configurations, the participant streams can include video data, and in some configurations audio data, streaming live from a video camera connected to the participant's client computing device. In some instances, a participant may not have access to a video camera and may communicate a participant stream comprising an image of the participant, or an image representative of the participant, such as, for example, an avatar.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

FIGS. 3E through 3I are screenshot overlay views of a display corresponding to one of the client computing devices in the teleconference session illustrating a user interface arrangement.

FIGS. 4C and 4D are screenshot persistent views of a display corresponding to one of the client computing devices in the teleconference session illustrating a user interface arrangement.

FIGS. 5A through 5H are screenshot views of a display corresponding to one of the client computing devices in the teleconference session illustrating a user interface arrangement having drill-in features.

DETAILED DESCRIPTION

Figure 1:
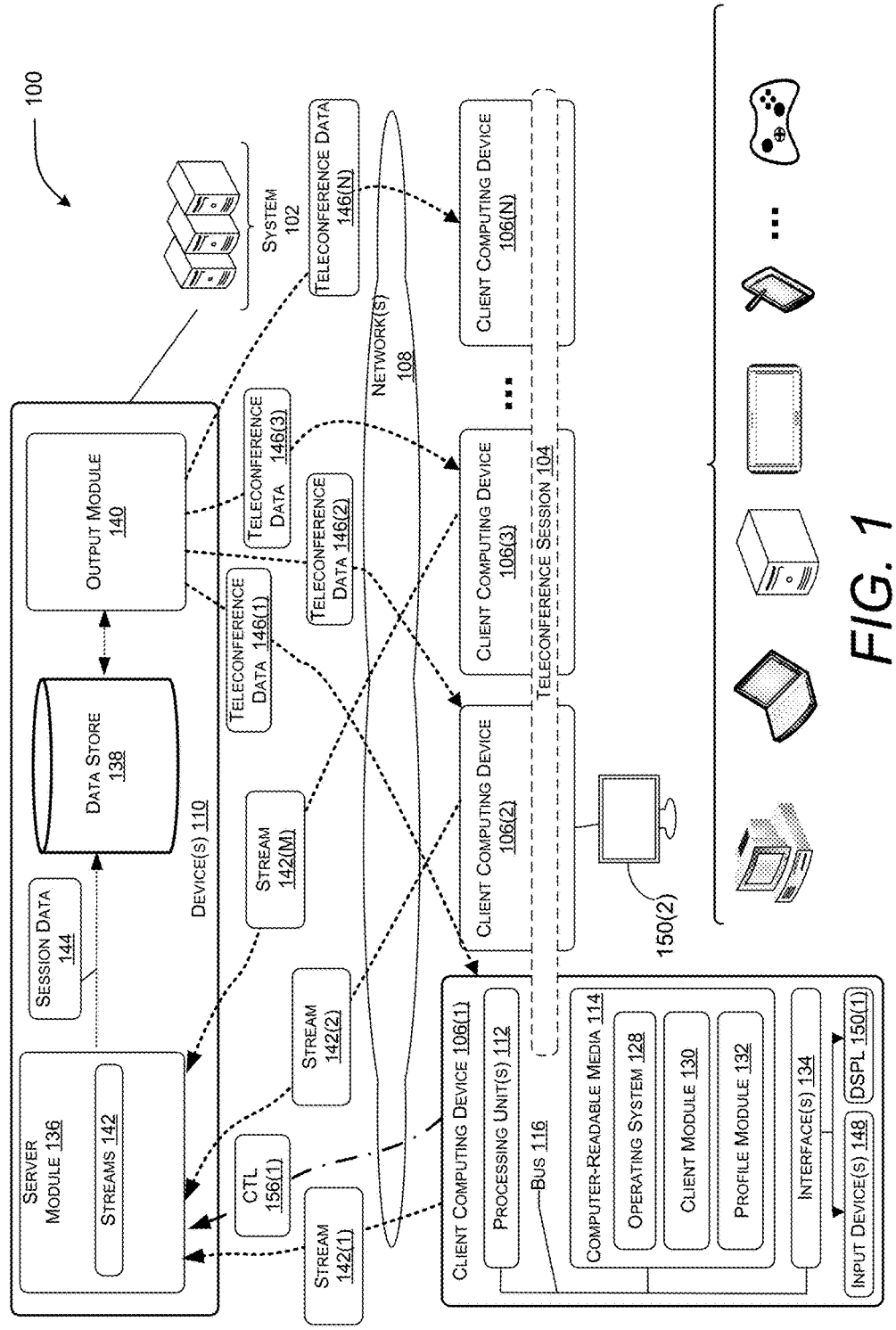
FIG. 1 is a block diagram of an example of a teleconference system.

Examples described below enable a system to provide a teleconference session at a client computing device with the capability of event driven adjustment of the session displayed on the client computing device. The teleconference session may be event adjusted at a teleconference server connected to a plurality of client computing devices participating in the teleconference session. The client computing devices may be configured to allow a user to adjust his or her viewing experience of the teleconference session using graphical user interface controls available to the user during the session. In an example implementation, the teleconference session receives participant streams from client computing devices used by the participants. The participant streams include video, audio, or image data of the participants to identify or represent the participants in the display of the teleconference session at the client computing devices. The teleconference session may also receive content streams from one or more client computing devices, or from another source. The content streams include all streams that are not participant streams. In some configurations, the content streams include video or image data of files, data structures, word processing documents, formatted documents (e.g. PDF documents), spreadsheets, or presentations to be presented to, and thereby shared with, the participants in the display of the teleconference session. The teleconference session at the server combines the streams to generate teleconference data and transmits the teleconference data to each client computing device according to a teleconference session view configured for each client computing device.

In some implementations, teleconference sessions include event driven display of teleconference data. For example, a teleconference session may be displayed in a user interface arrangement on a client computing device. The user interface arrangement may include a first display area and a second display area. A first stream of teleconference data may be displayed in the first display area and a second stream of teleconference data may be displayed in the second display area. An event may occur that removes a video component from the first stream of the teleconference data. In response to the event, the first stream of the teleconference data is removed from the first display area, and one or more streams is then rendered in the first display area. The one or more streams rendered in the first display area may include an audio component or audio and video components. In some implementations, the first stream of the teleconference data is provided or generated by the client computing device displaying the user interface. Specifically, some implementations remove the first stream from the user interface arrangement when an event removes a video component associated with the first stream.

Therefore, some described implementations provide a user interface arrangement with dynamically removed and/ or rearranged streams of teleconference data based on one or more events. Dynamically arranging streams of teleconference data based on one or more events may enhance a user's experience of the teleconference session.

In the description below, individual streams may be referred to as "streams" or "media streams." Content streams may be referred to as "content media streams," and participant streams may be referred to as "user media streams." As noted above, the user media streams, like participant streams, may include audio and/or video or image data depicting or representing the participant in the teleconference session. The content media streams, like the content streams, may be an image or video representing a document, video, audio or other media content that may be shared with the users of the client computing devices for discussion among the participants of the teleconference session.

The teleconference session view may be tailored for each client computing device using one of several user interface arrangements. For a given client computing device, the teleconference session view may be in a first user interface arrangement referred to herein as an overlay view, a second user interface arrangement referred to herein may be described as a persistent view, or third or other user interface arrangements may describe other desired views. An overlay view provides a total display experience in which either people or content is viewed "on stage," which is a primary stream display area of an interface. In some configurations, the primary stream display area of an interface can be displayed in a manner that dominates the display on a user's client computing device. The overlay view allows a user to engage with the content being shared among the teleconference participants, or to engage with the participants, or at least the most active participants.

In the persistent view, the content or participants are displayed in the primary stream display area, where the primary stream display area occupies a majority of the display, leaving space for a secondary stream display area. In the persistent view, the secondary stream display area does not overlap the primary stream display area; such an arrangement is described herein as a side-by-side configuration. The secondary stream display area includes user interface elements that display participants or content that are not displayed in the primary stream display area.

In FIG. 1, a diagram illustrating an example of a teleconference system 100 is shown in which a system 102 can control the display of a teleconference session 104 in accordance with an example implementation. In this example, the teleconference session 104 is between a number of client computing devices 106(1) through 106(N) (where N is a positive integer number having a value of two or greater). The client computing devices 106(1) through 106(N) enable users to participate in the teleconference session 104. In this example, the teleconference session 104 may be hosted, over one or more network(s) 108, by the system 102. That is, the system 102 may provide a service that enables users of the client computing devices 106(1) through 106(N) to participate in the teleconference session 104. As an alternative, the teleconference session 104 may be hosted by one of the client computing devices 106(1) through 106(N) utilizing peer-to-peer technologies.

The system 102 includes device(s) 110, and the device(s) 110 and/or other components of the system 102 may include distributed computing resources that communicate with one another, with the system 102, and/or with the client computing devices 106(1) through 106(N) via the one or more network(s) 108. In some examples, the system 102 may be an independent system that is tasked with managing aspects of one or more teleconference sessions 104. As an example, the system 102 may be managed by entities such as SLACK®, WEBEX®, GOTOMEETING®, GOOGLE HANGOUTS®, etc.

Network(s) 108 may include, for example, public networks such as the Internet, private networks such as an institutional and/or personal intranet, or some combination of private and public networks. Network(s) 108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 108 may utilize communications protocols, including packet-based and/or datagram-based protocols such as Internet protocol ("IP"), transmission control protocol ("TCP"), user datagram protocol ("UDP"), or other types of protocols. Moreover, network(s) 108 may also include a number of devices that facilitate network communications and/or form a hardware basis for the networks, such as switches, routers, gateways, access points, firewalls, base stations, repeaters, backbone devices, and the like.

In some examples, network(s) 108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, and so forth), and other standards.

In various examples, device(s) 110 may include one or more computing devices that operate in a cluster or other grouped configuration to share resources, balance load, increase performance, provide fail-over support or redundancy, or for other purposes. For instance, device(s) 110 may belong to a variety of classes of devices such as traditional server-type devices, desktop computer-type devices, and/or mobile-type devices. Thus, although illustrated as a single type of device—a server-type device—device(s) 110 may include a diverse variety of device types and are not limited to a particular type of device. Device(s) 110 may represent, but are not limited to, server computers, desktop computers, web-server computers, personal computers, mobile computers, laptop computers, mobile phones, tablet computers, or any other sort of computing device.

A client computing device (e.g., one of client computing device(s) 106(1) through 106(N)) may belong to a variety of classes of devices, which may be the same as, or different from, device(s) 110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality (AR) device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. In some implementations, a client computing device includes input/output ("I/O") interfaces that enable communications with input/output devices such as user input devices including peripheral input devices (e.g., a game controller, a keyboard, a mouse, a pen, a voice input device, a touch input device, a gestural input device, and the like) and/or output devices including peripheral output devices (e.g., a display, a printer, audio speakers, a haptic output device, and the like).

Client computing device(s) 106(1) through 106(N) of the various classes and device types can represent any type of computing device having one or more processing unit(s) 112 operably connected to computer-readable media 114 such as via a bus 116, which in some instances can include one or more of a system bus, a data bus, an address bus, a PCI bus, a Mini-PCI bus, and any variety of local, peripheral, and/or independent buses. The computer-readable media 114 may store executable instructions and data used by programmed functions during operation. Examples of functions implemented by executable instructions stored on the computer-readable media 114 may include, for example, an operating system 128, a client module 130, a profile module 132, and other modules, programs, or applications that are loadable and executable by processing units (s) 112.

Client computing device(s) 106(1) through 106(N) may also include one or more interface(s) 134 to enable communications with other input devices 148 such as network interfaces, cameras, keyboards, touch screens 106(3), and pointing devices (mouse). For example, the interface(s) 134 enables communications between client computing device(s) 106(1) through 106(N) and other networked devices, such as device(s) 110 and/or devices of the system 102, over network(s) 108. Such network interface(s) 134 may include one or more network interface controllers (NICs) or other types of transceiver devices to send and receive communications and/or data over a network.

In the example environment 100 of FIG. 1, client computing devices 106(1) through 106(N) may use their respective client modules 130 to connect with one another and/or other external device(s) in order to participate in the teleconference session 104. For instance, a first user may utilize a client computing device 106(1) to communicate with a second user of another client computing device 106(2). When executing client modules 130, the users may share data, which may cause the client computing device 106(1) to connect to the system 102 and the other client computing devices 106(2) through 106(N) over the network 108.

The client module 130 of each client computing device 106(1) through 106(N) may include logic that detects user input and communicates control signals to the server to request changes in the view of the teleconference session 104 on the display. For example, the client module 130 in the first client computing device 106(1) in FIG. 1 may detect a user input at an input device 148. The user input may be sensed, for example, as a finger press on a user interface element displayed on a touchscreen, or as a click of a mouse on a user interface element selected by a pointer on the display 150. The client module 130 translates the user input according to a function associated with the selected user interface element. The client module 130 may send a control signal 156(1) to a server (for example, a server operating on the device 110) to perform the desired function.

In one example function, the user of the client computing device 106(1) may wish to switch the view on the display 150 from a first user interface arrangement that provides a first look, feel and experience for the participant to a second user interface arrangement that provides a different look, feel and experience. The user may click on the desired user interface element, such as a button, for example, on the user's display 150. The client module 130 may identify the click of the button as a request to switch views and send a corresponding control signal 156(1) to a teleconference session host to perform the view switching function. The control signal 156(1) in this function is a view switch control signal.

The client computing device(s) 106(1) . . . 106(N) may use their respective profile modules 132 to generate participant profiles, and provide the participant profiles to other client computing devices and/or to the device(s) 110 of the system 102. A participant profile may include one or more of an identity of a participant (e.g., a name, a unique identifier ("ID"), etc.); participant data, such as personal data and location data may be stored. Participant profiles may be utilized to register participants for teleconference sessions.

As shown in FIG. 1, the device(s) 110 of the system 102 includes a server module 136, a data store 138, and an output module 140. The server module 136 is configured to receive, from individual client computing devices 106(1) through 106(N), a stream 142(1) through 142(M) (where M is a positive integer number equal to 2 or greater). In some scenarios, not all the client computing devices utilized to participate in the teleconference session 104 provide an instance of streams 142, and thus, M (the number of instances submitted) may not be equal to N (the number of client computing devices). In some other scenarios, one or more of the client computing devices may be communicating an additional stream or transmission of media streams that includes content, such as a document or other similar type of media intended to be shared during the teleconference session.

The server module 136 is also configured to receive, generate and communicate session data 144 and to store the session data 144 in the data store 138. In various examples, the server module 136 may select aspects of the streams 142 that are to be shared with the client computing devices 106(1) through 106(N). The server module 136 may combine the streams 142 to generate teleconference data 146 defining aspects of the teleconference session 104. The teleconference data 146 can comprise individual streams containing select streams 142. The teleconference data 146 can define aspects of the teleconference session 104, such as a user interface arrangement of the user interfaces on the clients, the type of data that is displayed and other functions of the server and clients. The server module 136 may configure the teleconference data 146 for the individual client computing devices 106(1)-106(N). Teleconference data can be divided into individual instances referenced to as 146(1)-146(N). The output module 140 may communicate the teleconference data instances 146(1)-146(N) to the client computing devices 106(1) through 106(N). Specifically, in this example, the output module 140 communicates teleconference data 146(1) to client computing device 106(1), teleconference data 146(2) to client computing device 106(2), teleconference data 146(3) to client computing device 106(3), and teleconference data 146(N) to client computing device 106(N), respectively.

The teleconference data instances 146(1)-146(N) may communicate audio components that may include video components representative of the contribution of each participant in the teleconference session 104. Each teleconference data instance 146(1)-146(N) may also be configured in a manner that is unique to the needs of each participant user of the client computing devices 106(1) through 106(N). Each client computing device 106(1)-106(N) may be associated with a teleconference session.

Figure 2:
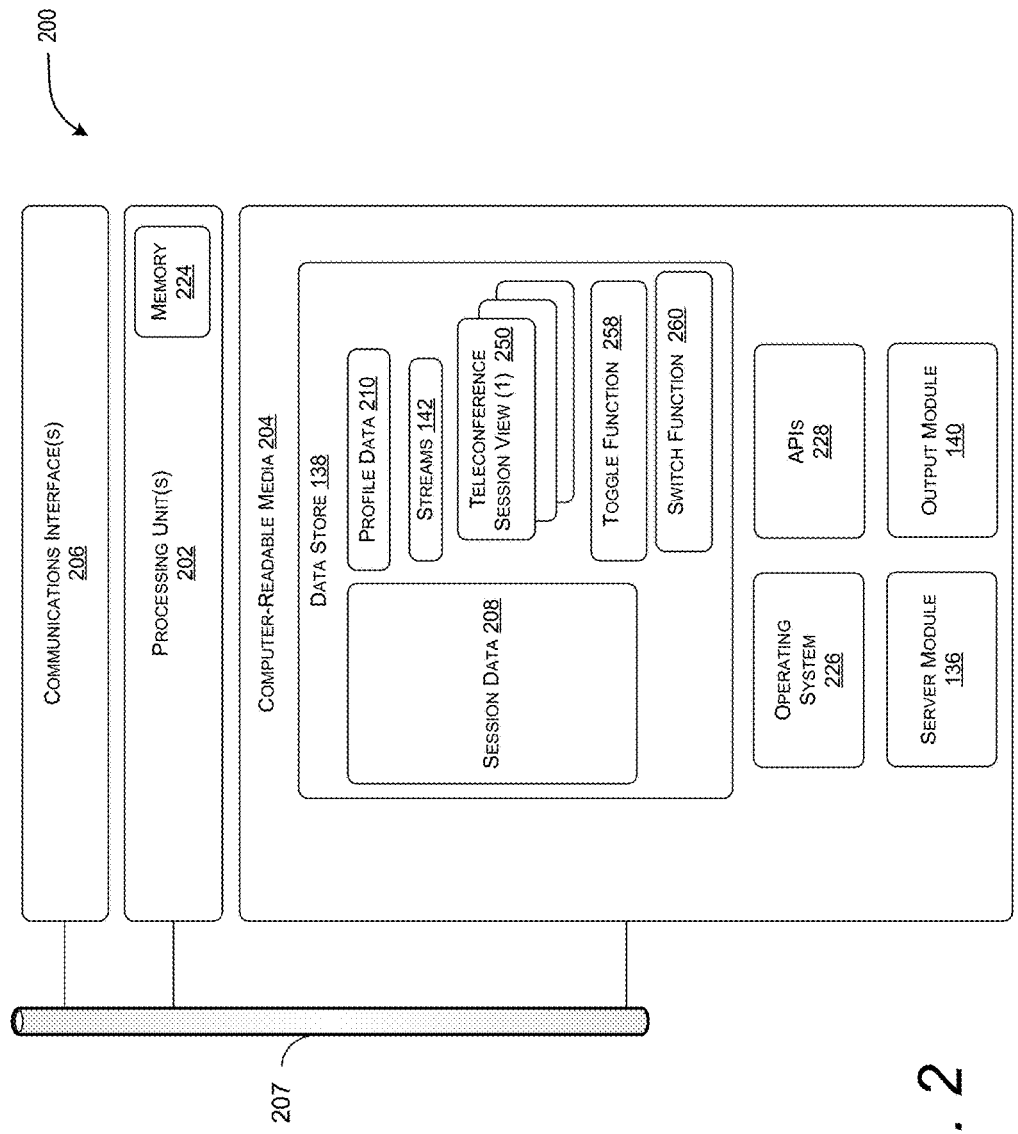
FIG. 2 is a block diagram of an example of the device in the teleconference system of FIG. 1.

In FIG. 2, a system block diagram is shown illustrating components of an example device 200 configured to provide the teleconference session 104 between the client computing devices, such as client computing devices 106(1)-106(N) in accordance with an example implementation. The device 200 may represent one of device(s) 110 and/or 106 where the device 200 includes one or more processing unit(s) 202, computer-readable media 204, communication interface(s) 206. The components of the device 200 are operatively connected, for example, via a bus 207, which may include one or more of a system bus, a data bus, an address bus, a PCI bus, a Mini-PCI bus, and any variety of local, peripheral, and/or independent buses.

As utilized herein, processing unit(s), such as the processing unit(s) 202 and/or processing unit(s) 112, may represent, for example, a CPU-type processing unit, a GPU-type processing unit, a field-programmable gate array ("FPGA"), another class of digital signal processor ("DSP"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 204 and/or computer-readable media 114, may store instructions executable by the processing unit(s). The computer-readable media may also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media may include computer storage media and/or communication media. Computer storage media may include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 206 may represent, for example, network interface controllers ("NICs") or other types of transceiver devices to send and receive communications over a network. In some implementations, the communication interfaces 206 are used to communicate over a data network with client computing devices 106.

In the illustrated example, computer-readable media 204 includes the data store 138. In some examples, the data store 138 includes data storage such as a database, data warehouse, or other type of structured or unstructured data storage. In some examples, the data store 138 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 138 may store data for the operations of processes, applications, components, and/or modules stored in computer-readable media 204 and/or data executed by processing unit(s) 202 and/or accelerator(s). For instance, in some examples, the data store 138 may store session data 208 (e.g., session data 144), profile data 210, and/or other data. The session data 208 may include a total number of participants in the teleconference session 104, and activity that occurs in the teleconference session 104 (e.g., behavior, activity of the participants), and/or other data related to when and how the teleconference session 104 is conducted or hosted. Examples of profile data 210 include, but are not limited to, a participant identity ("ID") and other data.

In an example implementation, the data store 138 stores data related to the view each participant experiences on the display of the participants' client computing devices 106. As shown in FIG. 2, the data store 138 may include a teleconference session view 250(1) through 250(N) corresponding to the display of each client computing device 106(1) through 106(N) participating in the teleconference session 104. In this manner, the system 102 may support individual control over the view each user experiences during the teleconferenced session 104. For example, as described in more detail below with reference to FIGS. 3A-3F and 4A-4D, the system 102 permits a user to participate with an overlay view or a persistent view displayed on the user's client computing device 106. Overlay views feature the display of desired media on a stage that may cover substantially an entire display screen. Controls, user interface elements such as icons, buttons, menus, etc., and other elements not directly relevant to the presentation provided by the teleconference session on the display simply do not appear. A persistent view provides a stage, or primary stream display area, that covers a dominant area of the display and one or more marginal, or secondary stream display areas, that render other aspects of the teleconference session.

In some implementations, the persistent and overlay views provide display areas that each include a rendering of a stream of teleconference data. The stream renderings in each of the display areas may be controlled by one or more events. For example, in one implementation a first stream and a first display area includes video and audio components. The user may toggle a user interface control (e.g., an event) that removes the video component from the first display area. In response, the first stream may be removed from the first display area and replaced with another stream that includes video and audio components. In some implementations, the first stream is generated by a client computing device displaying the teleconference session. The toggle is communicated to the server module 136 in a control signal 156, which is a toggle control signal for a toggle function. The server module 136 may modify a teleconference session view 250 accordingly. In some implementations, the event removing the video component from the first display area is initiated by the teleconference system 100. For example, one or more of the devices associated with the teleconference system 100 may initiate removing the video from the first display area when it is determined that a communication channel conveying at least the video no longer supports or includes video data. Such an activity is referred to as an "audio-only" stream, or an event involving a transition to an audio-only stream. In another example, in response to a transition to an audio-only stream, one or more of the devices associated with the teleconference system 100 may initiate removing the video from the first display area, wherein the removal is based on one or more settings.

Persistent and overlay views provide the user with options for how the user may experience the teleconference session. The view on a user's display may be changed under user control to emphasize different aspects of a teleconference session based on the interest of the user. A user may wish to view content, such as a document, or presentation, more closely than the media being communicated from the users. Each user may focus, or promote, the content over the participants by having the content rendered in the primary stream display area. Conversely, a user may wish to engage more closely with participants by promoting the media transmitted by the participants to the primary stream display area of the display.

The teleconference session view 250(1)-250(N) may store data identifying the view being displayed for each client computing device 106(1)-106(N). The teleconference session view 250 may also store data relating to streams of the media streams configured for display, the participants associated with the streams, whether content media is part of the display, and information relating to the content. Some teleconference sessions may involve a large number of participants. However, only a core number of the participants may be what can be referred to as "active participants." The teleconference session view for each user may be configured to focus on media provided by the most active participants. Some teleconference sessions may involve a presenter, such as in a seminar, or a presentation by one or more individuals. At any given time, one participant may be a presenter, and the presenter may occupy an enhanced role in a teleconference session. The presenter's role may be enhanced by maintaining a consistent presence on the user's display. Information relating to the presenter may be maintained in the teleconference session view 250.

During a teleconference session, a participant may wish to switch to different views of the session at any given time to emphasize or promote either content or people in the user's view. The user can toggle on a user interface element representing the people or content the user wants to promote. The toggle is communicated to the server module 136 in a control signal 156, which is a toggle control signal for a toggle function. The server module 136 may modify a teleconference session view 250 accordingly.

As noted above, the data store 138 may store the profile data 210, streams 142, teleconference session views 250, session data 208, toggle function 258, and switch function 260. Alternately, some or all the above-referenced data can be stored on separate memories 224 on board one or more processing unit(s) 202 such as a memory on board a CPU-type processor, a GPU-type processor, an FPGA-type accelerator, a DSP-type accelerator, and/or another accelerator. In this example, the computer-readable media 204 also includes an operating system 226 and an application programming interface(s) 228 configured to expose the functionality and the data of the device(s) 110 (e.g., example device 200) to external devices associated with the client computing devices 106(1) through 106(N). Additionally, the computer-readable media 204 includes one or more modules such as the server module 136 and an output module 140, although the number of illustrated modules is just an example, and the number may vary higher or lower. That is, functionality described herein in association with the illustrated modules may be performed by a fewer number of modules or a larger number of modules on one device or spread across multiple devices.

As such and as described earlier, in general, the system 102 is configured to host the teleconference session 104 with the plurality of client computing devices 106(1) through 106(N). The system 102 includes one or more processing units 202 and a computer-readable medium 204 having encoded thereon computer-executable instructions to cause the one or more processing units 202 to receive streams 142(1)-142(M) at the system 102 from a plurality of client computing devices 106(1)-106(N), select streams 142 based, at least in part, on the teleconference session view 250 for each user, and communicate teleconference data 146 defining the teleconference session views 250 corresponding to the client computing devices 106(1) through 106(N). The teleconference data instances 146(1)-146(N) are communicated from the system 102 to the plurality of client computing devices 106(1) through 106(N). The teleconference session views 250(1)-250(N) cause the plurality of client computing devices 106(1)-106(N) to display views of the teleconference session 104 under user control. The computer-executable instructions may also cause the one or more processing units 202 to determine that the teleconference session 104 is to transition to a different teleconference session view of the teleconference session 104 based on a user communicated view switch control signal 156.

In some implementations, the techniques disclosed herein may utilize one or more interface arrangements, also referred to as "views," or "teleconference session views." In an example of an operation, the system 102 performs a method that includes receiving the streams 142(1)-142(N) at the system 102 from a plurality of client computing devices 106(1)-106(N). The system combines and formats the streams 142 based, at least in part, on a selected teleconference session view for each client computing device to generate teleconference data 146, e.g., teleconference data instances 146(1)-146(N). The teleconference data instances 146(1)-146(N) are then communicated to the individual client computing devices 106(1)-106(N).

As will be described below, the interface arrangements of the teleconference session views can include a primary stream display area (referred to herein as a "canvas" or "stage") and a secondary stream display area (referred to herein as a display area of the display that displays "thumbnails"). In some implementations, the secondary stream display area can individually be configured as a region comprising selectable user interface elements for selecting streams of media streams associated with the individual display areas. The predetermined interface arrangements can also include graphical elements providing control functionality ("control elements") for a teleconference session. For instance, a graphical element may be generated on the user interface enabling a user to provide content, end a session, mute one or more sounds, etc.

In one illustrative example, the techniques disclosed below can utilize the overlay view. The overlay view may comprise one or more control elements. In some configurations, the control elements can be displayed to the user for a predetermined period of time and then fade after the predetermined period of time has lapsed. In response to certain types of user activity, such as hovering a pointing device over a predetermined area of the user interface, the control elements may reappear for a predetermined period of time.

The overlay view can include the presentation of people or content in a primary stream display area and the presentation of people or content in a secondary stream display area. The secondary stream display area can include user interface elements that may be rendered for a predetermined period of time. The user interface elements are rendered as an overlay on the primary stream display area in a user-ON state, and then fade (e.g., are configured to disappear) after the predetermined period of time has lapsed.

A given user interface element in the secondary stream display area can be selected by a user to "pin" a particular display of content or a person to the user interface. The user interface element for the content or user for which the "pin" element is selected does not fade over time, but rather remains displayed in the secondary stream display area overlaid on the primary stream display area.

In another illustrative example, the techniques disclosed herein can utilize the persistent view. The persistent view can provide one or more control elements, which can be configured. In general, the persistent view is designed to provide an optimized interface for sharing content. The persistent view can include the presentation of people or content in a primary stream display area or, either content or people in the secondary stream display area. In the persistent view, the presentation of the people or content in the secondary stream display area does not disappear after a predetermined period of time.

In yet another illustrative example, the primary stream display area may comprise a plurality of teleconference data streams rendered therein. The plurality of streams may comprise video and audio components or audio components only. One of the plurality of streams may include teleconference data generated by the computing device displaying the primary stream display area. The primary stream display area may be part of a user interface arrangement. The one of the plurality of streams including teleconference data generated by the computing device may include video and audio components. An event, such as a user caused event or a system-level caused event, may remove the video component from the one of the plurality of streams generated by the computing device. In response to the event, the one of the plurality of streams generated by the computing device may be removed from the primary steam display area. One or more of the remaining plurality of teleconference data streams rendered in the stream primary display area may be rearranged after the one of the plurality of streams generated by the computing device is removed from the primary stream display area. In some implementations, another stream comprising video and audio components replaces the removed one or more of the plurality of streams. Similarly, the secondary stream display area may also comprise a plurality of teleconference data streams rendered therein. However, in some implementations, the renderings in the secondary stream display area may be smaller than the renderings in the primary stream display area.

It is noted that the above description of the hosting of a teleconference session 104 by the system 102 implements the control of the teleconference session view in a server function of the device 110. In some implementations, the server function of the device 110 may combine all media portions into the teleconference data for each client computing device 106 to configure the view to display. The information stored in the teleconference session view as described above may also be stored in a data store of the client computing device. The client computing device may receive a user input and translate the user input as being a view switching control signal that is not transmitted to the server. The view switching control signal may be processed on the client computing device itself to cause the display to switch to the desired view. The client computing device 106 may change the display by re-organizing the portions of the media streams and content media streams (if present) in the teleconference data 146 received from the server according to the view selected by the user.

Reference will now be made to FIGS. 3A-3F, which illustrate example displays in the overlay view. In the overlay view, a display 150 comprises a primary stream display area 302, which is also referred to herein as a "stage." In the persistent view, a display 150 comprises a primary stream display area 302 (a "stage") and a secondary stream display area, which shows thumbnails of other streams. In some configurations, the system 100 may default to the persistent view when the streams include content streams. A user can select a user interface element, or provide any other command, to transition between a persistent view and an overlay view.

Figure 3B:
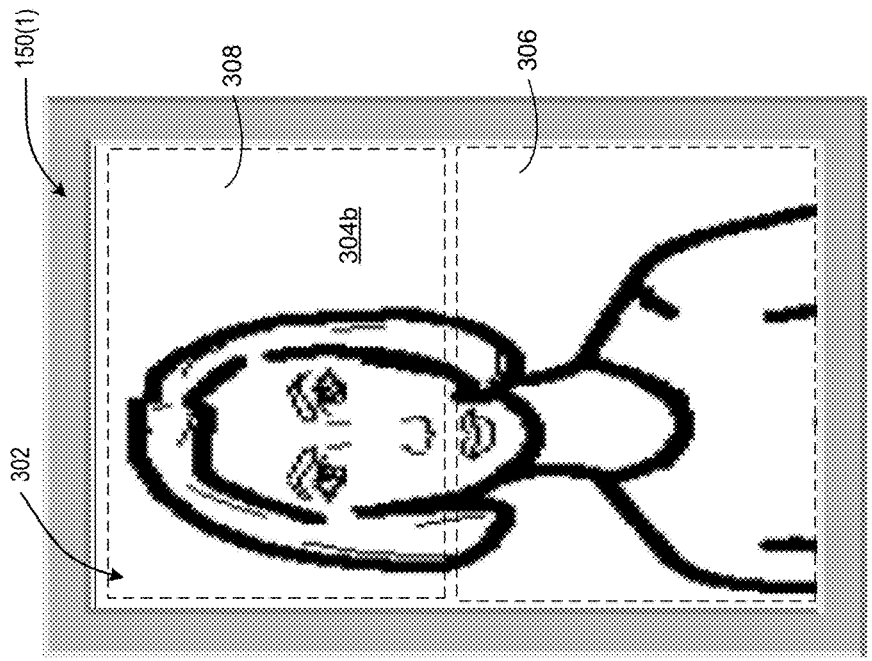
FIGS. 3A and 3B are screenshot overlay views of a display corresponding to one of the client computing devices in the teleconference session illustrating a user interface arrangement.
Figure 3A:
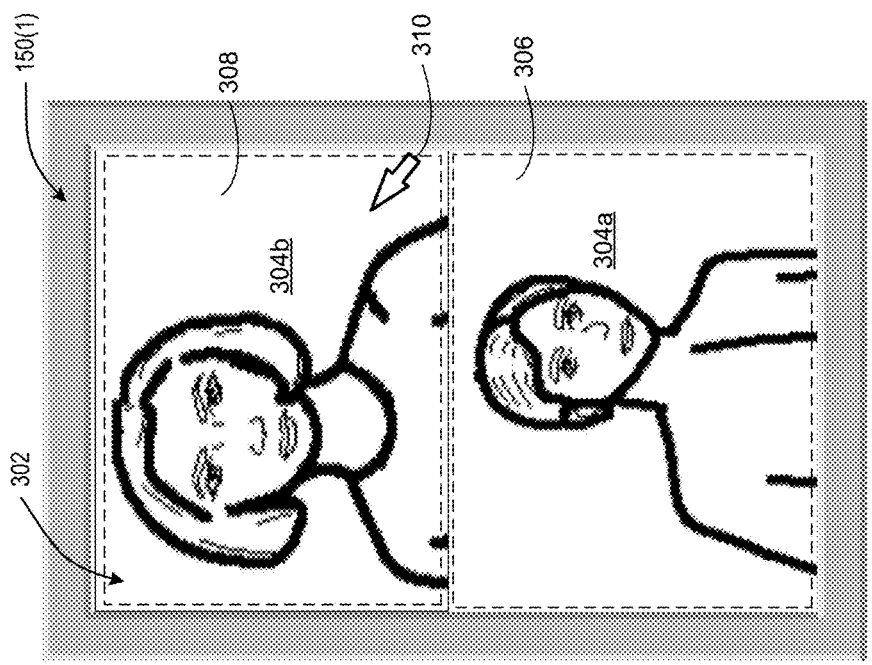

FIGS. 3A-3B depict an example of a display 150(1), which is shown connected to the interface 134 of the client computing device 106(1) in FIG. 1, displaying an overlay view of the teleconference session 104 in a user-OFF state in accordance with an example implementation.

The overlay view of display 150(1) includes a primary stream display area 302 extending across the screen area of the display 150(1). In some configurations, the primary stream display area 302 is configured in a manner that dominates the display. In some configurations, the primary stream display area 302, e.g., the "stage" of a teleconference session, can be substantially from edge-to-edge or full-screen. As summarized above, when a user transition to a persistent view, the interface can include a secondary stream display area (see FIGS. 4A-4D). In some configurations, the primary stream display area 302 can be larger than the secondary stream display area. The examples of FIG. 3A-3B illustrate one example of the overlay view that does not display a secondary stream display area. A pointer 310 is provided to permit the user to interact with the view. In this example, the primary stream display area 302 is displaying two renderings, each of which are referred to herein as graphic elements 304a and 304b, each rendering corresponding to a user media stream. The streams may include an audio component, audio and video components, or audio component and an image (e.g., an avatar or picture) representation of a user participating in the teleconference session. An exemplary rendering of an audio component and an image (e.g., an avatar or picture) is shown in FIG. 3F. See in particular graphic element 304c. An exemplary rendering of a user media stream that includes only an audio component would be similar to the graphic element 304c, but without the avatar or picture.

Two graphic elements 304a-304b are shown occupying the primary stream display area 302 of a user interface arrangement in the example shown in FIG. 3A; however, any number of graphic elements may be displayed. In some examples, the number of displayed graphic elements may be limited to a maximum by available bandwidth or by a desire to limit video clutter on the display 150(1). In some implementations, fewer than two graphic elements 304a-304b may be displayed when fewer than two participants are involved in the teleconference session. In teleconference sessions involving more than the maximum number of graphic elements, the graphic elements 304a-b displayed may correspond to the dominant or those deemed to be "active participants." The designation of "active participants" may be pre-defined as a reference to specific people, or as in some implementations, a function may be provided to identify "active participants" versus passive participants by applying an activity level priority.

The activity level priority ranks participants based on their likely contribution to the teleconference. In an example implementation, an activity level priority for identifying active versus passive participants may be determined at the server 136 by analyzing the media stream of each participant. The teleconference system may include a function that compares the activity of participants and dynamically promotes those who speak more frequently or those that move and/or speak more frequently to be the active participants.

The placement of the graphic elements 304a-304b may also reflect the activity level priority of the participants to which the graphic elements correspond. For example, an overlay view may be defined as having a convention in which the top of the primary stream display area 302 displays the graphic element 304b corresponding to the most dominant participant. In some sessions, the dominant participant may be a presenter.

In some implementations, the graphic element 304a is rendered in a first display area 306. The first display area 306 is shown by a dashed line box. Additionally, the graphic element 304b is rendered in a second display area 308. The second display area 308 is also shown by a dashed lined box. The dashed line boxes do not appear on the display 150(1).

In some implementations, the graphic element 304a includes a video component and an audio component. An event may occur that causes removal of the video component associated with the graphic element 304a. The event may be a user caused event, such as a user toggled control associated with a user interface of the client computing device 106(1), an event caused by a client computing device, such as the client computing device 106(1), or an event caused by the device 110. In one example, the client computing device 106(1) or system 100 may trigger an event that causes the removal of the video component associated with the graphic element 304a when it is determined that communication bandwidth will not provide reliable or user consumable video.

The system 100 may remove the graphic element 304a from the primary stream display area 302. Specifically, the client computing device 106(1) and/or the device 110 may remove the graphic element 304a from the primary stream display area 302 in response to the removal of the video component associated with the graphic element 304a.

In some implementations, the primary stream display area 302 is rearranged to render one or more streams of teleconference data in the first display area 306 once the graphic element 304a is removed. For example, the graphic element 304b may be enlarged (see FIG. 3B) so that the graphic element 304b is at least partially rendered in the first display area 306.

In another example, the graphic element 304b remains in the second display area 308, and one or more streams of teleconference data is rendered in the first display area 306 in place of the removed graphic element 304a. In a particular example, the one or more streams of teleconference data rendered in the first display area 306, after removal of the graphic element 304a, includes video and audio components. In another example, the one or more streams of teleconference data rendered in the first display area 306, after removal of the graphic element 304a, includes an audio component and an avatar or image component. An exemplary rendering of an audio component and an image (e.g., an avatar or picture) is shown in FIG. 3F. See in particular graphic element 304c. An exemplary rendering of a user media stream that includes only an audio component would be similar to the graphic element 304c, but without the avatar or picture. An exemplary rendering of an audio component and an image (e.g., an avatar or picture) is shown in FIG. 3F. See in particular graphic element 304c. in such configurations, a graphical element 375, such as a ring around the avatar, can change display properties, e.g., be highlighted, change thickness, or otherwise change its appearance, to indicate when a user is talking.

In some implementations, the graphic element 304a removed from the first display area 306 is associated with a stream of teleconference data that was generated by or originated at the client computing device 106(1) associated with the display 150 (1), also referred to herein as a "ME" user interface element or graphic element. In some cases, embodiments may remove the renderings of the "ME" user interface element or graphic element while not removing renderings of other streams that transition to an audio-only mode. Stated differently, graphic elements, such as the graphic element 304a and/or 304b, may not be removed from the primary stream display area 302 when the graphic element 304a and/or 304b does not include a video component. For example, in some implementations, a graphic element, such as the graphic element 304a or 304b, is removed from the primary stream display area 302 only when a video component of the graphic element is removed and a stream of teleconference data associated with the graphic element was generated by or originated at the client computing device 106(1), such as by an input device 148 associated with the client computing device 106(1).

Figures 3C, 3D:
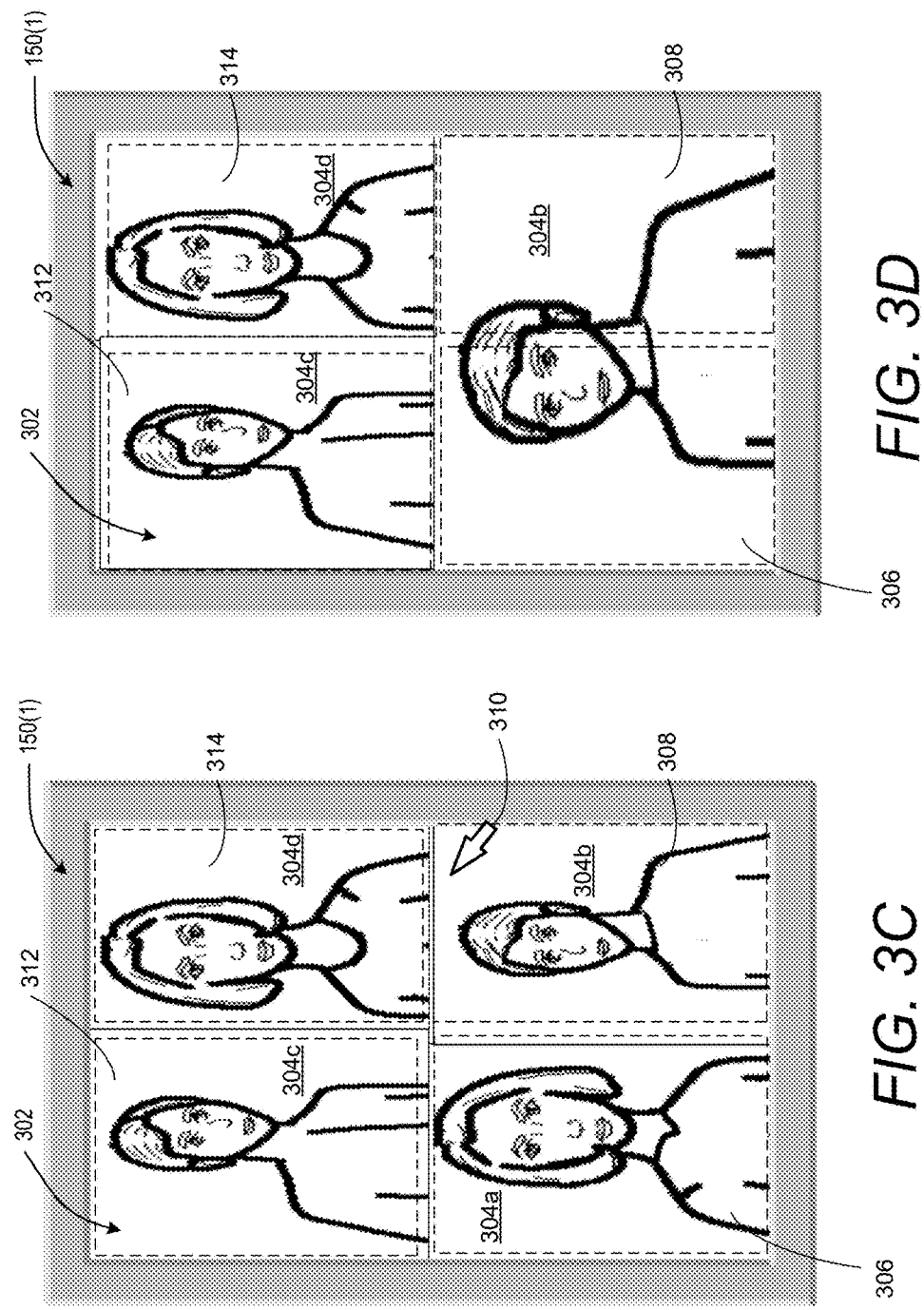
FIGS. 3C and 3D are screenshot overlay views of a display corresponding to one of the client computing devices in the teleconference session illustrating a user interface arrangement.

FIGS. 3C-3D depict the example of display 150(1), which is shown connected to interface 134 of client computing device 106(1) in FIG. 1, displaying an overlay view of the teleconference session 104 in a user-OFF state in accordance with an example implementation.

The overlay view of display 150(1) includes a primary stream display area 302 extending across the screen area of the display 150(1). In some configurations, the primary stream display area 302 is configured in a manner that dominates the display. In some configurations, the primary stream display area 302 can be substantially from edge-to-edge. As summarized above, the overlay view can optionally include a secondary stream display area based on one or more conditions. In some configurations, the primary stream display area 302 can be larger than the secondary stream display area (see FIGS. 4A-4D). The examples of FIGS. 3C-3D illustrate one example of the overlay view that does not display a secondary stream display area. A pointer 310 is provided to permit the user to interact with the view. The primary stream display area 302 is divided into four graphic elements 304a-d each corresponding to a user media stream. The user media stream may include an audio component, audio and video components, or audio component and an image (e.g., an avatar or picture) representation of a user participating in the teleconference session. An exemplary rendering of an audio component and an image (e.g., an avatar or picture) is shown in FIG. 3F. See in particular graphic element 304c.

Four graphic elements 304a-304d are shown occupying the primary stream display area 302 of a user interface arrangement in the example shown in FIGS. 3C-3D; however, any number of graphic elements may be displayed. In some examples, the number of displayed graphic elements may be limited to a maximum by available bandwidth or by a desire to limit video clutter on the display 150(1). In some implementations, fewer than four graphic elements 304a-304c may be displayed when fewer than four participants are involved in the teleconference session. In teleconference sessions involving more than the maximum number of graphic elements, the graphic elements 304a-304d displayed may correspond to the dominant or those deemed to be "active participants." The designation of "active participants" may be pre-defined as a reference to specific people, or as in some implementations, a function may be provided to identify "active participants" versus passive participants by applying an activity level priority.

The activity level priority ranks participants based on their likely contribution to the teleconference. In an example implementation, an activity level priority for identifying active versus passive participants may be determined at the server 136 by analyzing the media stream of each participant. The teleconference system may include a function that compares the activity of participants and dynamically promotes those who speak more frequently or those that move and/or speak more frequently to be the active participants.

The placement of the graphic elements 304a-304d may also reflect the activity level priority of the participants to which the graphic elements correspond. For example, an overlay view may be defined as having a convention in which the top right of the primary stream display area 302 displays the graphic element 304d corresponding to the most dominant participant. In some sessions, the dominant participant may be a presenter.

In some implementations, the graphic element 304a is rendered in a first display area 306. The first display area 306 is shown by a dashed line box. Additionally, the graphic element 304b is rendered in a second display area 308. The second display area 308 is also shown by a dashed lined box. Furthermore, the graphic element 304c is rendered in a third display area 312 and the graphic element 304d is rendered in a fourth display area 314. The third and fourth display areas 312 and 314 are also represented by a dashed line box, respectively. The dashed line boxes do not appear on the display 150(1).

In some implementations, the graphic element 304a includes a video component and an audio component. An event may occur that causes removal of the video component associated with the graphic element 304a. The event may be a user caused event, such as a user toggled control associated with a user interface of the client computing device 106(1), an event caused by a client computing device, such as the client computing device 106(1), or an event caused by the device 110. In one example, the client computing device 106(1) or system 100 may trigger an event that causes the removal of the video component associated with the graphic element 304a when it is determined that communication bandwidth will not provide reliable or user consumable video.

The system 100 may remove the graphic element 304a from the primary stream display area 302. Specifically, the client computing device 106(1) and/or the device 110 may remove the graphic element 304a from the primary stream display area 302 in response to the removal of the video component associated with the graphic element 304a.

In some implementations, the primary stream display area 302 is rearranged to render one or more streams of teleconference data in the first display area 306 once the graphic element 304a is removed. For example, the graphic element 304b may be enlarged (see FIG. 3D) so that the graphic element 304b is at least partially rendered in the first display area 306. In another example, the graphic element 304b remains in the second display area 308, and one or more streams of teleconference data is rendered in the first display area 306 in place of the removed graphic element 304a. In a particular example, the one or more streams of teleconference data rendered in the first display area 306, after removal of the graphic element 304a, includes video and audio components. In another example, the one or more streams of teleconference data rendered in the first display area 306, after removal of the graphic element 304a, includes an audio component and an avatar or image component.

In some implementations, the graphic element 304a removed from the first display area 306 is associated with a stream of teleconference data that was generated by or originated at the client computing device 106(1) associated with the display 150 (1), also referred to herein as the "ME" user interface element or graphic element. In some implementations, graphic elements, such as the graphic element 304a, 304b, 304c and/or 304d are not removed from the primary stream display area 302 when the graphic element 304a, 304b, 304c and/or 304d does not include a video component. For example, in some implementations, a graphic element, such as the graphic element 304a, 304b, 304c or 304d, is removed from the primary stream display area 302 only when a video component of the graphic element is removed and a stream of teleconference data associated with the graphic element was generated by or originated at the client computing device 106(1).

FIGS. 3E-3F depict the example of display 150(1), which is shown connected to interface 134 of client computing device 106(1) in FIG. 1, displaying an overlay view of the teleconference session 104 in a user-OFF state (FIG. 3E) and a user-ON state (FIG. 3F).

The overlay view of display 150(1) includes a primary stream display area 302 extending across the screen area of the display 150(1). In some configurations, the primary stream display area 302 is configured in a manner that dominates the display. In some configurations, the primary stream display area 302 can be substantially from edge-to-edge. As summarized above, the overlay view can optionally include a secondary stream display area based on one or more conditions (see FIGS. 4A-4D). In some configurations, the primary stream display area 302 can be larger than the secondary stream display area. The example of FIGS. 3E-3F illustrate one example of the overlay view that does not display a secondary stream display area. A pointer 310 is provided to permit the user to interact with the view. The primary stream display area 302 is divided into four graphic elements 304a-d each corresponding to a user media stream. The user media stream may include an audio component, audio and video components, or audio component and an image (e.g., an avatar or picture) representation of a user participating in the teleconference session.

Four graphic elements 304a-304d are shown occupying the primary stream display area 302 of a user interface arrangement in the example shown in FIGS. 3E-3F; however, any number of graphic elements may be displayed. In some examples, the number of displayed graphic elements may be limited to a maximum by available bandwidth or by a desire to limit video clutter on the display 150(1). In some implementations, fewer than four graphic elements 304a-304c may be displayed when fewer than four participants are involved in the teleconference session. In teleconference sessions involving more than the maximum number of graphic elements, the graphic elements 304a-d displayed may correspond to the dominant or those deemed to be "active participants." The designation of "active participants" may be pre-defined as a reference to specific people, or as in some implementations, a function may be provided to identify "active participants" versus passive participants by applying an activity level priority.

The activity level priority ranks participants based on their likely contribution to the teleconference. In an example implementation, an activity level priority for identifying active versus passive participants may be determined at the server 136 by analyzing the media stream of each participant. The teleconference system may include a function that compares the activity of participants and dynamically promotes those who speak more frequently or those that move and/or speak more frequently to be the active participants.

The placement of the graphic elements 304a-304d may also reflect the activity level priority of the participants to which the graphic elements correspond. For example, an overlay view may be defined as having a convention in which the top right of the primary stream display area 302 displays the graphic element 304d corresponding to the most dominant participant. In some sessions, the dominant participant may be a presenter.

In some implementations, the graphic element 304a is rendered in a first display area 306. The first display area 306 is shown by a dashed line box. Additionally, the graphic element 304b is rendered in a second display area 308. The second display area 308 is also shown by a dashed line box. Furthermore, the graphic element 304c is rendered in a third display area 312 and the graphic element 304d is rendered in a fourth display area 314. The third and fourth display areas 312 and 314 are also represented by a dashed line box, respectively. The dashed line boxes do not appear on the display 150(1).

In some implementations, the graphic element 304a includes a video component and an audio component. An event may occur that causes removal of the video component associated with the graphic element 304a. The event may be a user caused event, such as a user toggled control associated with a user interface of the client computing device 106(1), an event caused by a client computing device, such as the client computing device 106(1), or an event caused by the device 110. In one example, the client computing device 106(1) or the system 100 may trigger an event that causes the removal of the video component associated with the graphic element 304a when it is determined that communication bandwidth will not provide reliable or user consumable video.

The system 100 may remove the graphic element 304a from the primary stream display area 302. Specifically, the client computing device 106(1) and/or the device 110 may remove the graphic element 304a from the primary stream display area 302 in response to the removal of the video component associated with the graphic element 304a.

In some implementations, the primary stream display area 302 is rearranged to render one or more streams of teleconference data in the first display area 306 once the graphic element 304a is removed. For example, a graphic element 304e may be rendered in the first display area 306. In one example, the graphic element 304e may include an audio component and an avatar or image component. In another example, the graphic element 304e may include video and audio components. In another example, a plurality of additional graphic elements may be rendered in the first display area 306.

In some implementations, the graphic element 304a removed from the first display area 306 is associated with a stream of teleconference data that was generated by or originated at the client computing device 106(1) associated with the display 150 (1), also referred to herein as the "ME" user interface element or graphic element.

In some implementations, graphic elements, such as the graphic element 304a, 304b, 304c and/or 304d are not removed from the primary stream display area 302 when the graphic element 304a, 304b, 304c and/or 304d does not include a video component. For example, in some implementations, a graphic element, such as the graphic element 304a, 304b, 304c or 304d, is removed from the primary stream display area 302 only when a video component of the graphic element is removed and a stream of teleconference data associated with the graphic element was generated by or originated at the client computing device 106(1). For example, in FIG. 3F, the graphic element 304c is illustrated as having transitioned to a rendering of an audio component and an image (e.g., an avatar or picture). However, according to some implementations, the graphic element 304c is not removed from the primary stream display area 302 since the teleconference data associated with the rendering of the graphic element 304c was not generated by or originated from the client computing device 106(1) associated with the display 105(1). In other words, when remote participants transition to an audio-only state, the associated graphical representation or avatar may not be removed, while the "ME" rendering may be removed when a local participant transitions to an audio-only state.

In some implementations, a transition to the user-ON state may be triggered when the user moves the input device controlling the pointer 310 on display 150(1) in FIGS. 3A-3F. The client computing device 106 detects the input device motion, or any other type of input, and in response to the input, the device 106(1) may responsively transmit a state change indicator to the server 110 to modify the view from a user-OFF view shown in FIGS. 3A-3E to the user-ON view shown in FIG. 3F. The user-ON view shown in FIG. 3F may also be displayed as an overlay in association with other views described herein and/or illustrated in the drawings.

The user-ON state may also cause other user interface controls to appear on the display 150(1). For example, the display 150(1) may include a view controls 314. The view controls 316 may include control elements, such as buttons or switches, that may be used to change the teleconference session view. For example, the user may wish to switch to the persistent view, or to a multi-tasking view. The view controls 314 may also include tools for controlling the visual aspects of the display or other aspects of the session.

The user-ON state may also cause a set of core controls 330 to appear as shown in FIG. 3F. In the illustrated example, the view on the display 150(1) includes the set of core controls 330, which can be configured to control aspects of the teleconference session 104. For instance, a first button of the core controls 330 can disconnect the device 106(1) from the teleconference session 104. A second button of the core controls 330 can control the microphone of the device 106(1), i.e., a mute button. A third button of the core controls 330 can control the camera of the device 106(1), i.e., toggle the camera on or off. A fourth button of the core controls 330 can be used to add users to the session 104. In response to receiving the user actuation of the fourth button, a menu can be displayed enabling users to select other users to become meeting participants.

These examples of core controls 330 are provided for illustrative purposes only and are not to be construed as limiting. It can be appreciated that the core controls 330 can involve any suitable functionality related to the teleconference session 104. For instance, one or more buttons of the core controls 330 can change limits on the bandwidth related to the video data streams, display properties, etc. In some configurations, the display of the core controls 330 and/or view controls 316 can fade over a predetermined time period similar to the other controls that fade after a time period described above. In such configurations, the core controls 330 and/or view controls 316 can be redisplayed based on one or more actions, such as a hover or another suitable user gesture within a predetermined area of the user interface. The core controls 330 and/or view controls 316 may not be displayed in a user-OFF state, or after a predetermined period of time. In some configurations, the core controls 330 and/or view controls 316 may remain visible in the primary stream display area 302 of the display, or in another area of the display as required.

Figure 3H:
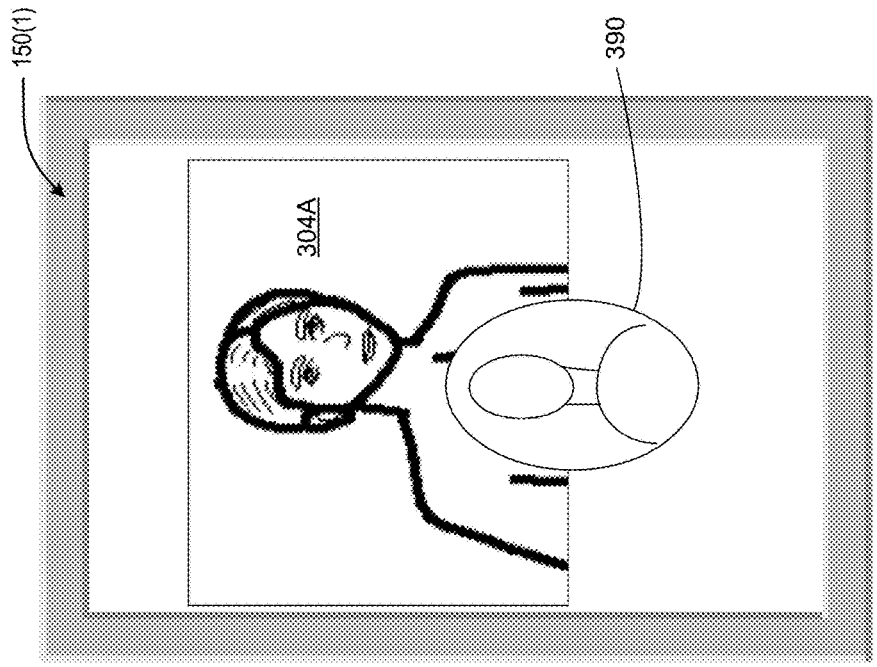
Figure 3G:
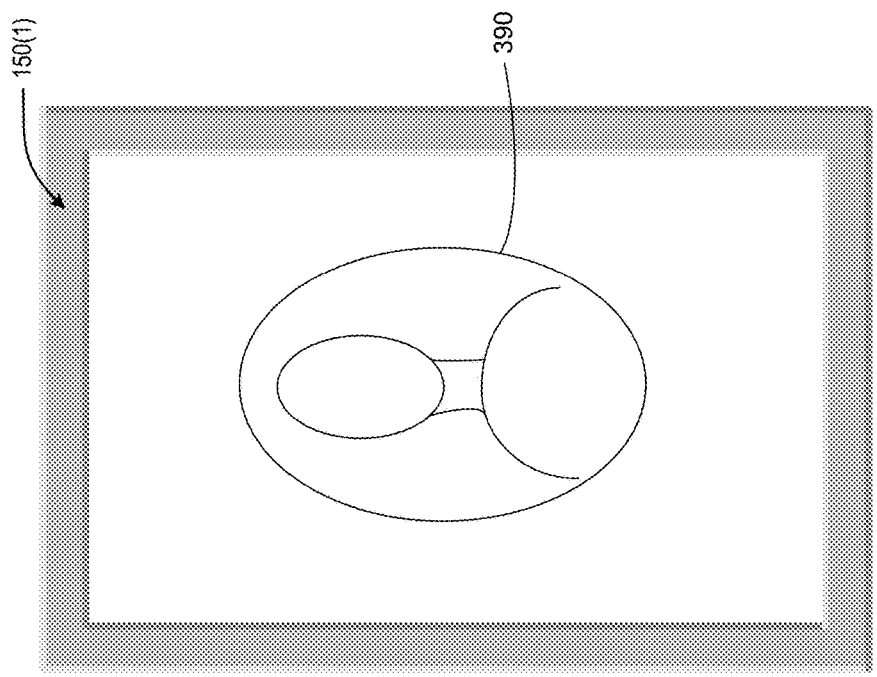

FIGS. 3G, 3H, and 3I illustrate several user interface progressions that may be utilized when a call is initiated. For illustrative purposes, consider an example where a first user is calling a second user. FIG. 3G illustrates a first example, a graphical user interface that is displayed when the first user is "audio-only, e.g., not sharing a video component. FIG. 3H illustrates a second example, a graphical user interface that is displayed when the first user is sharing a video component as well as an audio component.

In the first example, as shown in FIG. 3G, while the first user is placing the call, e.g. during dial-up or during the ringing phase, a first user interface arrangement is displayed to the first user. In this example, the user interface comprises a graphical representation 390 of the second user. The graphical representation 390 can include an image, drawing or any other suitable graphical element. In some configurations, the graphical representation 390 is centered on the display.

In the second example, as shown in FIG. 3H, while the first user is placing the call, e.g. during dial-up or during the ringing phase, a first user interface arrangement is displayed to the first user. In this example, the user interface comprises a graphical representation 390 of the second user. The graphical representation 390 can include an image, drawing or any other suitable graphical element. In some configurations, the graphical representation 390 can be off-center, e.g., lowered to display a background image. In this example, the user interface also comprises a live video feed of the first user as the background image. This embodiment enables the first user to see a preview of his or her video feed prior to connecting to a teleconference session.

In both examples, once the second user or a group of people establish a connection with the first user, a computing device can display the user interface illustrated in FIG. 3I. In the illustration shown in FIG. 3I, the second user is displayed in the primary stream display area 302 and the first user is displayed in a secondary stream display area 315. This configuration is described herein as the overlay view, an embodiment where the secondary stream display area 315 times out after predetermined time period. For example, the rendering of the first user 304b may be removed from the user interface after predetermined time period. The rendering of the first user 304b may be removed from the user interface can be removed based on other events, such as a removal of a video component of a stream. In another embodiment, from either interface shown in FIG. 3G or 3H, a computing device can display the user interface illustrated in FIG. 3A, where the first user is displayed in the first display area 306 and the second user is displayed in the second display area 308. From this state in a teleconference session 104, the computing device can transition to the other user interface arrangements as described herein. For example, when the first user transitions to an audio-only mode after the call has been established, the user interface shown in FIG. 3A or FIG. 3I can transition to FIG. 3B.

Figure 4B:
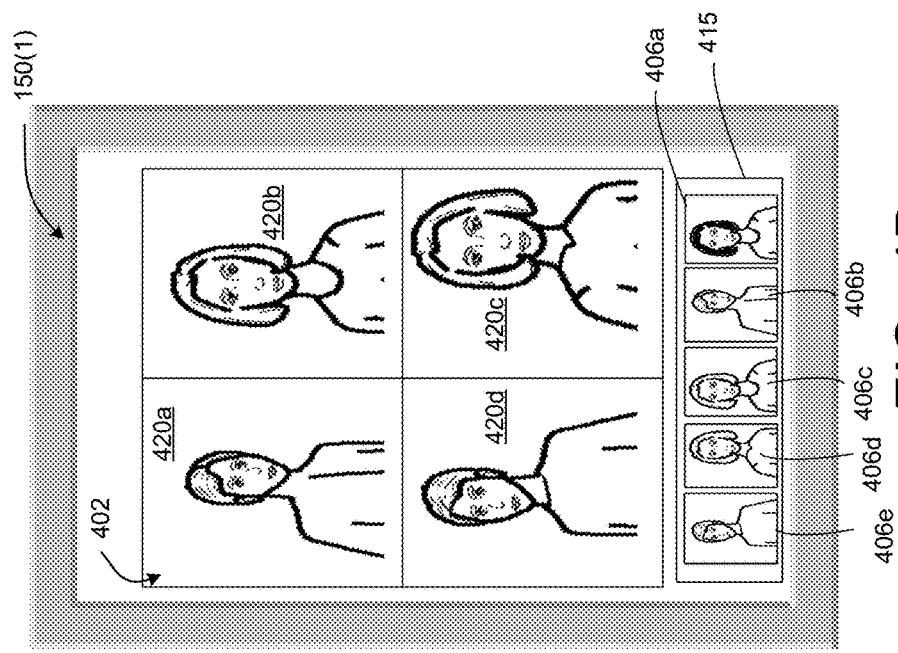
FIGS. 4A and 4B are screenshot persistent views of a display corresponding to one of the client computing devices in the teleconference session illustrating a user interface arrangement.
Figure 4A:
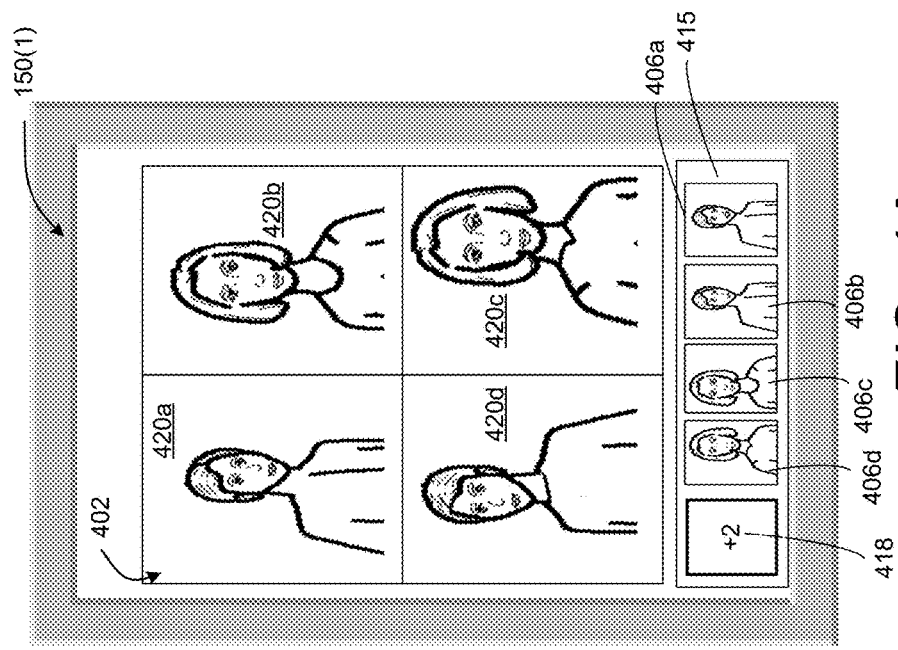

FIGS. 4A-4B illustrate an example of a persistent view displaying aspects of a teleconference session 104. The core controls 330 may be used to transition to the persistent view. Furthermore, the core controls 330 may be used to transition to the overlay view illustrated in FIGS. 3A-3F.

FIG. 4A depicts an example of the display 150(1) in the persistent view in which graphic elements 420a-420d are displayed in a primary stream display area 402, which is also referred to as the "stage." The primary stream display area 402 may populate the graphic elements 420a-420d in the same manner described in relation to FIGS. 3A-3F and the primary stream display area 302. Moreover, similar to the graphic elements illustrated in FIGS. 3A-3F, the primary stream display area 402 is not limited to the number of graphic elements represented in FIGS. 4A-4B.

The primary stream display area 402 has an area that dominates the display 150(1) while leaving space to display a secondary stream display area 415 concurrently with the primary stream display area 402. The persistent views in FIGS. 4A-4B provide a view in which both the primary stream display area 402 and the secondary stream display area 415 substantially cover a screen area of the display 150(1).

The secondary stream display area 415 may include graphic elements displayed as thumbnails or icons. More specifically as shown in FIG. 4A, the secondary stream display area 415 may include a plurality of graphic elements 406a-d displayed as thumbnails. The thumbnails may render video and audio components, an audio component with an image (e.g., an avatar or picture), or an audio component. Moreover, one of the plurality of graphic elements 406a-d displayed as thumbnails may include a "ME" graphic element (e.g., the graphic element 406a) displayed as an icon or thumbnail. The remaining plurality of graphic elements 406b-d may be active participants in a teleconference session 104. As described, the graphic elements 406a-d may be displayed as a thumbnail operating as a miniaturized video screen, an avatar with audio, or simply a box with audio.

The secondary stream display area 415 is displayed beneath the primary stream display area 402 so as not to overlay the primary stream display area 402. The secondary stream display area 415 is shown below the primary stream display area 402, but may be positioned anywhere on the display relative to the primary stream display area 402. For example, the display 150(1) may be rotated to landscape view. In landscape view, the secondary stream display area 415 may be positioned, for example, to the right or left of the primary stream display area 402.

The secondary stream display area 415 may include an overflow display area 418. The overflow display area 418 may include a quantity value. The quantity value may indicate a number of teleconference session participants that are not displayed as a graphic element on the display 150(1).

The graphic elements 420a-420d and 406a-406d may be represented as an image or video thumbnails that display an image or video corresponding to media streams transmitted by the users associated with the active participant user interface elements 420a-420d and 406a-406d. The image or video thumbnail may be implemented as a miniature video or image screen having any suitable aspect ratio such as for example, 16:9, 4:3, 3:2, 5:4, 5:3, 8:5, 1.85:1, 2.35:1, or any aspect ratio deemed suitable in specific implementations. The graphic elements 420a-420d and 406a-406d may be ranked, or prioritized as described herein. The position of the participant user interface elements 420a-420d and graphic elements 406a-406d may indicate the rank or priority based on an activity level priority.

The system 100 may determine an activity level priority for each participant in the teleconference session and include graphic elements with media streams from participants having the highest activity level priority. The activity level priority may be used to promote or demote participants thereby providing a dynamic presentation of participants in the display 150(1). For example, in some implementations, participant representations in the secondary stream display area 415 may be moved to the primary stream display area 402 as the associated participants become more active. Similarly, in some implementations, participant representations in the primary stream display area 402 may be moved to the secondary stream display area 415 as the associated participants become less active.

FIG. 4B depicts a view of the display 150(1) with modification to the secondary stream display area 415. As shown, the overflow display area 418 has been replaced with a graphic element 406e. Furthermore, the graphic element 406a has changed.

In some implementations, the graphic element 406a, illustrated in FIG. 4A, includes a video component and an audio component. An event may occur that causes removal of the video component associated with the graphic element 406a. The event may be a user caused event, such as a user toggled control associated with a user interface of the client computing device 106(1), an event caused by a client computing device, such as the client computing device 106(1), or an event caused by the device 110. In one example, the client computing device 106(1) or system 100 may trigger an event that causes the removal of the video component associated with the graphic element 406a when it is determined that communication bandwidth will not provide reliable or user consumable video.

The system 100 may remove the graphic element 406a from the secondary display area 415 and replace the removed graphic element 406a with the graphic element 406a illustrated in FIG. 4B. Specifically, the client computing device 106(1) and/or the device 110 may remove the graphic element 406a from the secondary stream display area 415 in response to the removal of the video component associated with the graphic element 406a.

In one example, the new graphic element 406a, illustrated in FIG. 4B, may include an audio component and an avatar or image component. An exemplary graphic element that comprises an audio component and an avatar or image component is shown in FIG. 3F (See the graphic element 304c). In another example, the new graphic element 406a may include video and audio components.

In some implementations, the graphic element 406a removed from the secondary stream display area 415 illustrated in FIG. 4A is associated with a stream of teleconference data that was generated by or originated at the client computing device 106(1) associated with the display 150(1), also referred to herein as the "ME" user interface element or graphic element.

In some implementations, graphic elements are not removed from the secondary stream display area 415 when the graphic element does not include a video component. For example, in some implementations, a graphic element may be removed from the secondary stream display area 415 only when a video component of the graphic element is removed and a stream of teleconference data associated with the graphic element was generated by or originated at the client computing device 106(1).

FIGS. 4C-4D illustrate another example of the persistent view including teleconference data. The core controls 330 may be used to transition to the persistent view. Furthermore, the core controls 330 may be used to transition to the overlay view illustrated in FIGS. 3A-3F.

In FIGS. 4C-4D, the reference numbers of elements in FIGS. 4A-4B are maintained for like elements having like functionalities. The display 150(1) in FIG. 4C includes a view with the primary stream display area 402. However, in this view, the display 150(1) includes a content media stream 420 rendered in the primary stream display area 402, rather than graphical elements.

In some configurations, a server or client computer can determine when content, such as the content media stream 420, is part of the teleconference data. For instance, the server can determine when a client computing device is sharing content media, such as a file, an image of an application, an application share screen, or any other type of content. Based on a determination of when content is part of the teleconference data or is not is part of the teleconference data, one or more views depicted in the figures may be provided.

FIGS. 5A through 5H are screenshot views of a display corresponding to one of the client computing devices in the teleconference session illustrating a user interface arrangement having drill-in features. Generally described, the drill-in features enable users to navigate two different user interfaces having floating monitor views. In some configurations, the floating monitor views can be controlled by one or more events, such as an event when a user transitions to an audio-only mode.

Figures 5A, 5B:
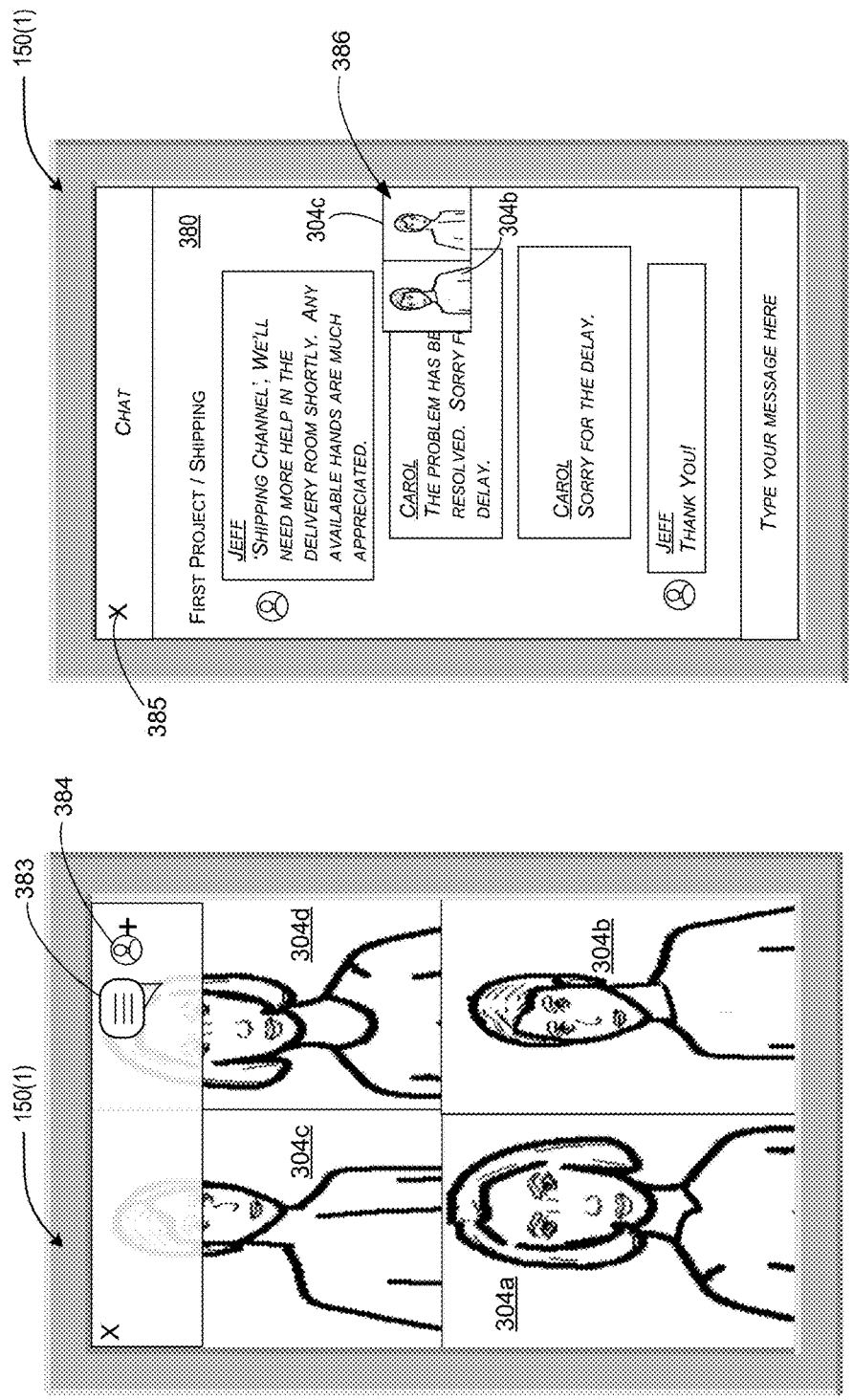
Figure 5C:
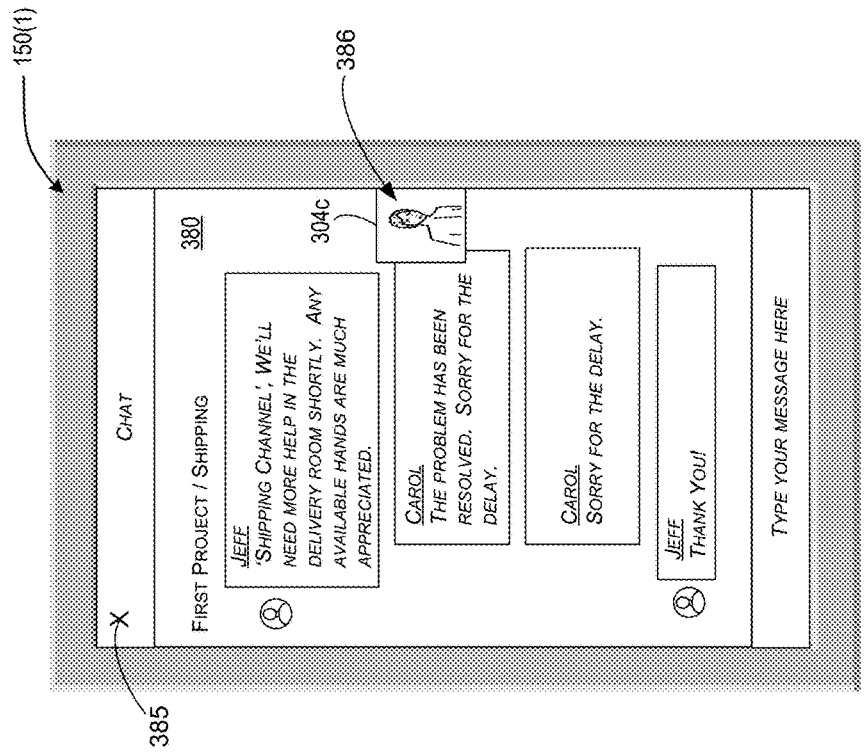

In a first example, a number of users are participating in a teleconference session 104. As shown in FIG. 5A, a number of renderings of users 304a-304d are displayed on a user interface. The user interface can also comprise one or more selectable graphical elements for receiving commands. For instance, a first graphical element 383 can be configured to transition the user interface to a chat view in response to a user selection. A second graphical element 384 can be configured to transition the user interface to another view, such as a user list, in response to a user selection. FIG. 5B illustrates an example of a chat view 380 that may be displayed in response to the selection of the first graphical element 383. In this example, the chat view 380 comprises text chat content. The chat view 380 comprises a teleconference session monitor view 386 of a rendering of at least one stream of the teleconference session 104. The selection of one stream can be based on an activity level of content or people. In this example, a rendering of a participant 304c is shown. Also shown, the chat view 380 can include a "ME" view showing the live video of the local participant, e.g., a rendering of the local participant 304b. In some configurations, the rendering of the "ME" view may be removed based on one or more events. In one example, the rendering of the "ME" view can be removed if the local user, e.g. the user viewing the stream of their local camera, transitions to an audio-only mode. FIG. 5C shows another version of the chat view 380 user interface when the "ME" view is removed in response to the local user transitioning to an audio-only mode. The chat view 380 user interface also comprises a control graphical element 385 for causing the user interface to transition back to the teleconference session view shown in FIG. 5A.

Figures 5D, 5E:
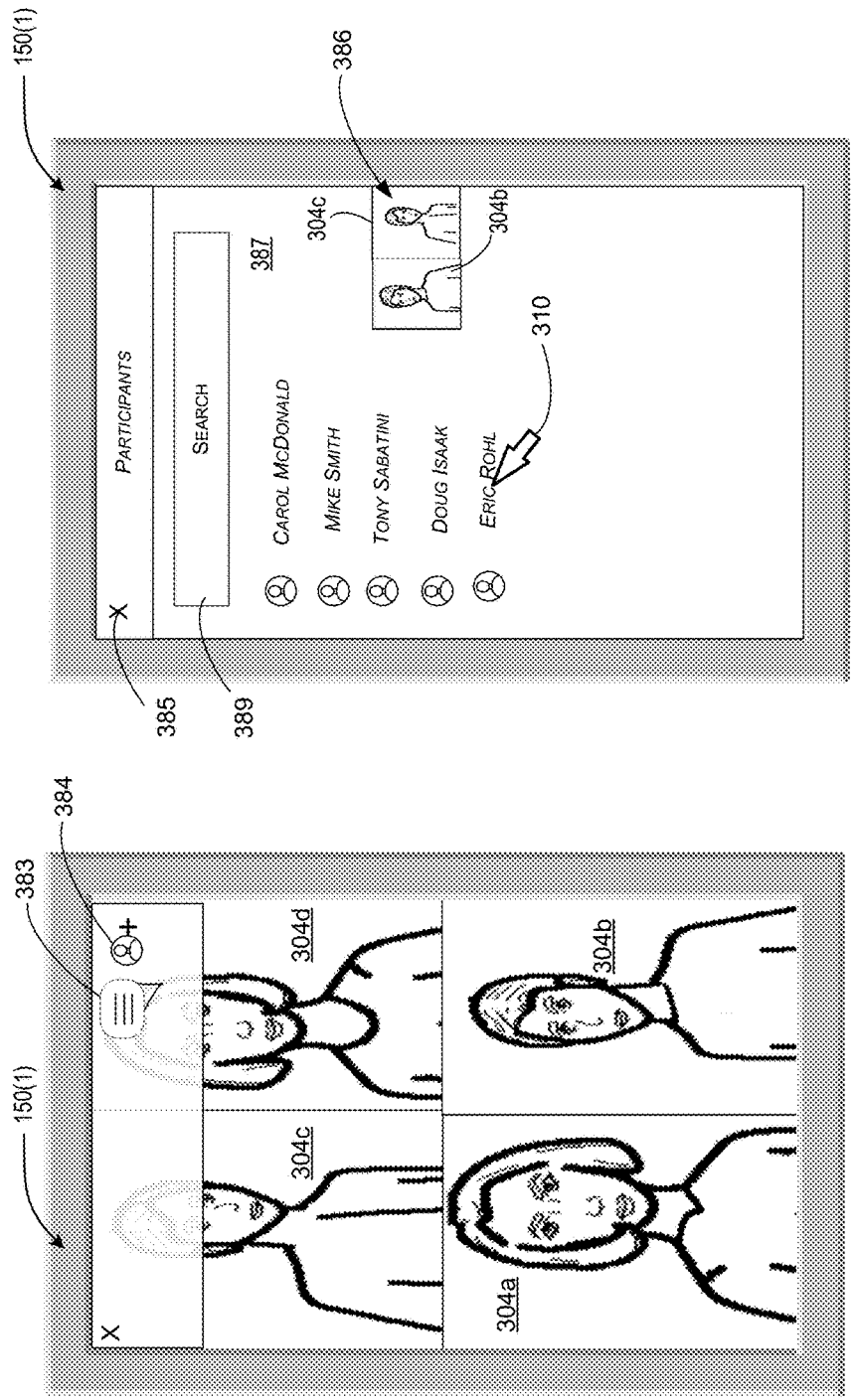
Figure 5F:
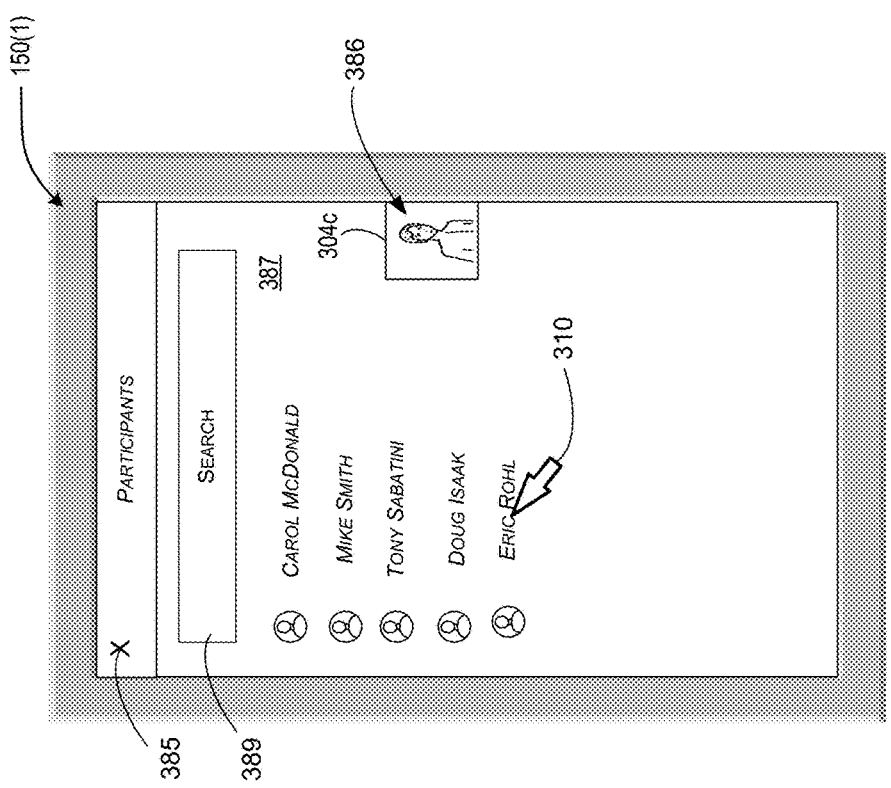

In a second example, shown in FIG. 5D through 5H, a device can transition from a teleconference session view to a participant information view. As shown in FIG. 5D, a number of renderings of users 304a-304d are displayed on a teleconference session view user interface. The teleconference session view user interface can also comprise one or more selectable graphical elements for receiving commands. For instance, a second graphical element 384 can be configured to transition the teleconference session view user interface to the participant information view in response to a user selection. FIG. 5E illustrates an example of a participant information view 387 that may be displayed in response to the selection of the second graphical element 384. In this example, the participant information view 387 comprises the names of the participants of a teleconference session 104. The participant information view 387 can also show images associated with the participants. In some configurations, the participant information view 387 can comprise a search bar 389 for receiving text entries. When the user enters text in the search bar 389, names of other users that may not be a part of the teleconference session 104 may be displayed.

The participant information view 387 can also comprise a teleconference session monitor view having a rendering of at least one stream 386 of the teleconference session 104. The selection of the stream can be based on an activity level of content or people. In this example, a rendering of a participant 304c is shown. Also shown, the participant information view 387 can include a "ME" view showing the live video of the local participant, e.g., a rendering of the local participant 304b. In some configurations, the "ME" view may be removed based on one or more events. In one example, the "ME" view can be removed if the local user, e.g. the user viewing the stream of their local camera, transitions to an audio-only mode. FIG. 5E shows another version of the participant information view 387 user interface when the "ME" view is removed in response to the local user transitioning to an audio-only mode. The user interface of FIG. SE also comprises a control graphical element 385 for causing the user interface to transition back to the teleconference session view shown in FIG. 5D.

The participant information view 387 can also be configured to enable a user to transition into the content or people. For instance, a user can select a participant's name by the use of a pointing device 310 or a touch screen feature. Such an event can cause a computing device to display a third view, such as the contact view 391 shown in FIG. 5G. The contact view 391 can display information related to a selected user. The contact view 391 can also comprise a teleconference session monitor view having a rendering of at least one stream 386 of the teleconference session 104. The selection of the stream can be based on an activity level of content or people. In this example, a rendering of a participant 304c is shown. Also shown, the contact view 391 can include a "ME" view showing the live video of the local participant, e.g., a rendering of the local participant 304b. In some configurations, the rendering of the "ME" view can be removed if the local user, e.g. the user viewing the stream of their local camera, to an audio-only mode. FIG. 5H shows another version of the contact view 391 user interface when the "ME" view is removed in response to the local user transitioning to an audio-only mode. The contact view 391 also comprises a control graphical element 385 for causing the user interface to transition back to the participant information view 387 shown in FIG. 5F.

Figure 6:
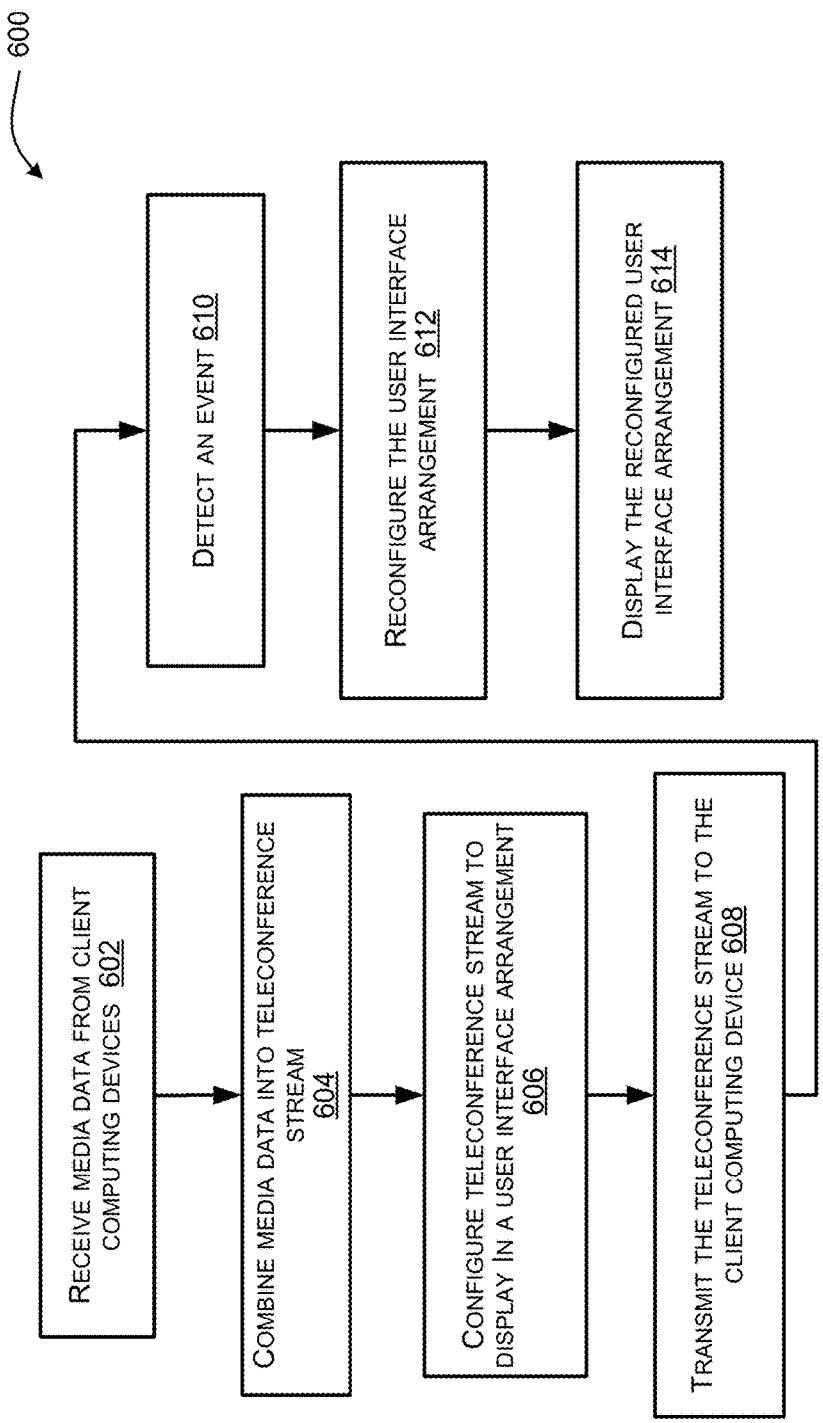
FIG. 6 is a flowchart illustrating an operation for providing a user interface arrangement in the exemplary teleconference system of FIG. 1.

Turning now to FIG. 6, aspects of a routine 600 for displaying the teleconference data on the display of a client computing device 106 are shown and described. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims. Furthermore, it is to be understood that the routine 600 may be implemented by one or more of the elements associated with the system 100.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 600 are described herein as being implemented, at least in part, by an application, component and/or circuit, such as the server module 136 in the device 110 in FIG. 1 in the system 100 hosting the teleconference session 104. In some configurations, the server module 136 can be a dynamically linked library (DLL), a statically linked library, functionality produced by an application programing interface (API), a compiled program, an interpreted program, a script or any other executable set of instructions. Data and/or modules, such as the server module 136, can be stored in a data structure in one or more memory components. Data can be retrieved from the data structure by addressing links or references to the data structure.

Although the following illustration may refer to the components of FIG. 1 and FIG. 2, it can be appreciated that the operations of the routine 600 may also be implemented in many other ways. For example, the routine 600 may be implemented, at least in part, or in modified form, by a processor of another remote computer or a local circuit, such as for example, the client module 130 in the client computing device 106(1). In addition, one or more of the operations of the routine 600 may alternatively or additionally be implemented, at least in part, by a chipset working alone or in conjunction with other software modules. Any service, circuit or application suitable for providing the techniques disclosed herein can be used in operations described herein.

Referring to FIG. 6, the routine 600 begins at block 602, where the server module 136 receives a plurality of streams 142(1)-142(N) from corresponding client computing devices 106(1)-106(N). Users of each client computing device 106(1)-106(N) communicate a request to join the teleconference session 104 and communicate a media stream 142 once authorized to participate in the teleconference session 104. The server module 136 receives the streams 142 from each client computing device 106(1)-106(N).

At block 604, portions of the media streams are combined to generate teleconference data 146 corresponding to a selected client computing device 106(1) having a display device 150(1). In some configurations, step 604 can involve an operation where a server and/or client computer can analyze the teleconference data or the media streams to determine the presence of content. For instance, the server can determine when a client computing device is sharing content media, such as a file, an image of an application, an application share screen, or any other type of content. Based on determining when content is part of the teleconference data or is not part of the teleconference data, one or more interface arrangements may be provided.

At block 606, the teleconference data is configured to display in a user interface arrangement, which may correspond to overlay views as described with reference to FIGS. 3A-3F. Alternatively, the teleconference data is configured to display in a user interface arrangement, which may correspond to persistent views as described with reference to FIGS. 4A-4D.

In some configurations, the user interface arrangement can include a rendering of a plurality of streams of the teleconference data 146. For example, the user interface arrangement may include a first display area and a second display area. The first and second display areas may be configured to each include a rendering of one or more of the plurality of streams of the teleconference data 146. In one implementation, the first display area is configured to render a first stream of the plurality of streams and the second display area is configured to render a second stream of the plurality of streams. The user interface arrangement may include a primary stream display area and/or a secondary stream display area.

At block 608, the teleconference data 146 is transmitted to the selected client computing device 106(1) to display the teleconference data. Once displayed, the user may view/participate in the teleconference session 104.

At block 610, an event is detected that removes a video component from the first stream of the plurality of streams. In some implementations, the first stream of the plurality of streams includes teleconference data generated by or originated at the client computing device 106 (1).

At block 612, the user interface arrangement is reconfigured. In one implementation, the system 100 reconfigures the user interface arrangement to remove the rendering of the first stream from the first display area. In some implementations, the removed first stream is replaced with at least one stream of the plurality of streams of the teleconference data 146. In some implementations, the at least one stream of the plurality of streams of the teleconference data 146, to replace the removed first stream, includes an audio component, an audio component and an image component (e.g., an avatar or a picture), or video and audio components.

At block 614, the reconfigured user arrangement is displayed on the client computing device 106 (1). Examples of reconfigured user arrangement are shown in the accompanying drawings and described herein.

The disclosure presented herein may be considered in view of the following examples.

Example 1

A method, comprising: transmitting teleconference data comprising a plurality of streams to at least one client computing device, the plurality of streams comprising at least a first stream and a second stream, individual streams of the plurality of streams including a video component and an audio component; causing the at least one client computing device to display a user interface arrangement comprising a first display area including a rendering of the first stream and a second display area including a rendering the second stream; detecting an event that removes the video component from the first stream; and in response to detecting the event that removes the video component from the first stream, causing the at least one client computing device to: remove the rendering of the first stream from the first display area, and render one or more streams of the plurality of streams in at least a portion of the first display area, the one or more streams including video and audio components.

Example 1

The method of Example 1, where the first stream is generated by one or more input devices of the at least one client computing device to display the user interface arrangement comprising the first display area and the second display area.

Example 3

The method of Examples 1 and 2, where the one or more streams comprises the second stream, and in response to detecting the event that removes the video component from the first stream, causing the at least one client computing device to enlarge the second stream so that the second stream is rendered in at least the portion of the first display area.

Example 4

The method of Examples 1, 2 and 3, where the one or more streams rendered in at least the portion of the first display area is a third stream of the plurality of streams.

Example 5

The method of Examples 1, 2, 3 and 4, where causing the at least one client computing device to display the user interface arrangement comprises causing the at least one client computing device to display the user interface arrangement comprising the plurality of display areas including the first display area, the second display area and an overflow display area including a rendering indicating a quantity of at least a plurality of the plurality of streams.

Example 6

The method of Example 5, comprising causing the at least one client computing device to: remove the rendering indicating the quantity of at least the plurality of the plurality of streams from the overflow display area, and render a third stream of the plurality of streams in the overflow display area.

Example 7

The method of Examples 1, 2, 3, 4, 5, and 6, where the event is at least one of: an event, initiated by a user, that removes the video component from the first stream; an event that removes the video component from the first stream; or an event, initiated by the at least one client computing device, that removes the video component from the first stream.

Example 8

A method, comprising: receiving, by at least one client computing device, teleconference data comprising a plurality of streams comprising at least a first stream and a second stream, each of the plurality of streams including a video component and an audio component; displaying, on a display associated with the at least one client computing device, a user interface arrangement comprising a first display area including a rendering of the first stream and a second display area including a rendering the second stream; detecting an event that removes the video component from the first stream; and in response to detecting the event that removes the video component from the first stream, removing the rendering of the first stream from the first display area, and rendering one or more streams of the plurality of streams in at least a portion of the first display area, the one or more streams including video and audio components.

Example 9

The method of Example 8, where the first stream is generated by the at least one client computing device displaying the user interface arrangement comprising the first display area and the second display area.

Example 10

The method of Examples 8 and 9, where the one or more streams of the plurality of streams is the second stream, and in response to detecting the event that removes the video component from the first stream, enlarging the second stream so that the second stream is rendered in the at least the portion of the first display area.

Example 11

The method of Examples 8, 9, and 10, where the one or more streams of the plurality of streams rendered in the at least the portion of the first display area is a third stream of the plurality of streams, wherein the third stream is selected based on an activity level priority.

Example 12

The method of Examples 8, 9, 10, and 11, where displaying the user interface arrangement display includes displaying the user interface arrangement comprising the plurality of display areas including the first display area, the second display area and an overflow display area including a rendering indicating a quantity of at least a plurality of the plurality of streams.

Example 13

The method of Example 12, comprising removing the rendering indicating the quantity of the at least the plurality of the plurality of streams from the overflow display area, and rendering a third stream of the plurality of streams in the overflow display area.

Example 14

The method of Examples 8, 9, 10, 11, 12 and 13, where the event is at least one of: an event, initiated by a user, that removes the video component from the first stream; an event that removes the video component from the first stream; or an event, initiated by the at least one client computing device, that removes the video component from the first stream.

Example 15

A system, comprising: one or more processing units; and a computer readable medium having encoded thereon computer executable instructions that cause the one or more processing units to: receive teleconference data comprising a plurality of streams comprising at least a first stream and a second stream, each of the plurality of streams including a video component and an audio component; display a user interface arrangement comprising a first display area including a rendering of the first stream and a second display area including a rendering the second stream; detect an event that removes the video component from the first stream; and in response to the event that removes the video component from the first stream: remove the rendering of the first stream from the first display area, and render one or more streams of the plurality of streams in at least a portion of the first display area, the one or more streams including video and audio components.

Example 16

The system of Example 15, where the first stream is provided by a client computing device to display the user interface arrangement comprising the first display area and the second display area.

Example 17

The system of Examples 15 and 16, where the one or more streams of the plurality of streams is the second stream, and in response to the event that removes the video component from the first stream, the computer executable instructions cause the one or more processing units to enlarge the second stream so that the second stream is rendered in the at least the portion of the first display area.

Example 18

The system of Examples 15, 16 and 17, where the one or more streams of the plurality of streams rendered in the at least the portion of the first display area is a third stream of the plurality of streams.

Example 19

The system of Examples 15, 16, 17 and 18, where the computer executable instructions cause the one or more processing units to display the user interface arrangement comprising the plurality of display areas including the first display area, the second display area and an overflow display area including a rendering indicating a quantity of at least a plurality of the plurality of streams.

Example 20

The system of Example 19, where the computer executable instructions cause the one or more processing units to remove the rendering indicating the quantity of the at least the plurality of the plurality of streams from the overflow display area, and render a third stream of the plurality of streams in the overflow display area.

Example 21

The system of Examples 15, 16, 17, 18, 19 and 20, where the event is at least one of: a user initiated event that removes the video component from the second stream; a server initiated event that removes the video component from the second stream; or a client computing device initiated event that removes the video component from the second stream.

Example 22

A method, comprising: transmitting teleconference data comprising a plurality of streams to at least one client computing device, the plurality of streams comprising a first stream and other streams, each of the plurality of streams including a video component and an audio component; causing the at least one client computing device to display a user interface arrangement comprising a first display area including a rendering of the first stream and a second display area including a rendering of one or more streams of the other streams; detecting an event that removes the video component from the first stream; in response to detecting the event that removes the video component from the first stream, causing the at least one client computing device to: remove the rendering of the first stream from the first display area, and reconfigure the user interface arrangement to display a rendering of at least one stream of the other streams in the first display area.

Example 23

The method of Example 22, where the first stream is generated by the at least one client computing device to display the user interface arrangement comprising the first display area and the second display area.

Example 24

The method of Examples 22 and 23, where the at least one stream of the other streams is the one or more streams of the other streams, and in response to the detecting the event that removes the video component from the first stream, causing the at least one client computing device to enlarge the one or more streams of the other streams so that the one or more streams of the other streams is rendered in the at least the portion of the first display area.

Example 25

The method of Examples 22, 23 and 24, where the at least one stream of the other streams rendered in the first display area is a second stream of the other streams.

Example 26

A method, comprising: transmitting teleconference data comprising a plurality of streams to at least one client computing device, the plurality of streams comprising at least a first stream and a second stream, each of the plurality of streams including at least a video and an audio component; causing the at least one client computing device to display a user interface arrangement comprising a first display area including a rendering of the first stream and a second display area including a rendering the second stream; detecting an event that removes a video component from the first stream, the first stream generated by an input device of the at least one client computing device; and in response to detecting the event that removes the video component from the first stream, causing the at least one client computing device to, remove the rendering of the first stream from the first display area, and render one or more streams of the plurality of streams in at least a portion of the first display area.

Example 27

The method of Example 26, where the one or more streams of the plurality of streams is the second stream, and in response to the detecting the event that removes the video component from the first stream, causing the at least one client computing device to enlarge the second stream so that the second stream is rendered in the at least the portion of the first display area.

Example 28

The method of Examples 26 and 27, where the user interface arrangement further comprises a selectable interface element, wherein the method further comprises: causing the at least one client computing device to display a second user interface arrangement in response to receiving a selection of the selectable interface element, the second user interface arrangement comprising a first display area including a description of one or more participants, the rendering of the first stream, and a rendering of a selected stream, the selected stream based on an activity level priority, wherein the second user interface arrangement further comprises a second selectable interface element; and causing the at least one client computing device to display the first user interface arrangement in response to receiving a selection of the second selectable interface element.

Example 29

The method of Example 28, where the rendering of the first stream is removed in response to detecting an event that removes a video component from the first stream.

Example 30

The method of Example 28, further comprising: receiving a selection of a participant of the one or more participants; and causing the at least one client computing device to display a third user interface arrangement in response to receiving a selection of the participant, wherein the third user interface arrangement comprises contact information of the participant, wherein the third user interface arrangement further comprises a rendering of a first stream, and a rendering of the selected stream, wherein the third user interface arrangement further comprises a second selectable interface element for causing the display of the second user interface arrangement.

Example 31

The method of Example 30, where the rendering of the first stream of the third user interface arrangement is removed in response to detecting the event that removes the video component from the first stream.

Example 32

The method of Examples 26, 27, 28 and 29, where the user interface arrangement further comprises a selectable interface element, wherein the method further comprises: causing the at least one client computing device to display a second user interface arrangement in response to receiving a selection of the selectable interface element, the second user interface arrangement comprising a first display area including a contextual chat associated with one or more participants. a rendering of the first stream, and a rendering of a selected stream, the selected stream based on an activity level priority, wherein the second user interface arrangement further comprises a second selectable interface element; and causing the at least one client computing device to display the first user interface arrangement in response to receiving a selection of the second selectable interface element.

Example 33

The method of Example 32, where the rendering of the first stream is removed in response to detecting an event that removes a video component from the first stream.

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

We claim:
1. A method, comprising:
   receiving, by at least one client computing device, teleconference data comprising a plurality of streams comprising at least a first stream and a second stream, each of the plurality of streams including a video component and an audio component;
   displaying, on a display associated with the at least one client computing device, a user interface arrangement comprising a first display area including a rendering of the first stream and a second display area including a rendering the second stream;
   detecting an event that removes the video component from the first stream; and
   in response to detecting the event that removes the video component from the first stream,
      replacing the rendering of the first stream by removing the rendering of the first stream from the first display area, and rendering one or more streams of the plurality of streams in the first display area, the one or more streams including video and audio components.

2. The method of claim 1, wherein the first stream is generated by the at least one client computing device displaying the user interface arrangement comprising the first display area and the second display area.

3. The method of claim 1, wherein the one or more streams of the plurality of streams is the second stream, and in response to detecting the event that removes the video component from the first stream, enlarging the second stream so that the second stream is rendered in the at least the portion of the first display area.

4. The method of claim 1, wherein the one or more streams of the plurality of streams rendered in the at least the portion of the first display area is a third stream of the plurality of streams, wherein the third stream is selected based on an activity level priority.

5. The method of claim 1, wherein displaying the user interface arrangement display includes displaying the user interface arrangement comprising the plurality of display areas including the first display area, the second display area and an overflow display area including a rendering indicating a quantity of at least a plurality of the plurality of streams.

6. The method of claim 5, comprising removing the rendering indicating the quantity of the at least the plurality of the plurality of streams from the overflow display area, and rendering a third stream of the plurality of streams in the overflow display area.

7. The method of claim 1, wherein the event is at least one of: an event, initiated by a user, that removes the video component from the first stream; an event that removes the video component from the first stream; or an event, initiated by the at least one client computing device, that removes the video component from the first stream.

8. A system, comprising:
one or more processing units; and
a computer readable medium having encoded thereon computer executable instructions that cause the one or more processing units to:
receive teleconference data comprising a plurality of streams comprising at least a first stream and a second stream, each of the plurality of streams including a video component and an audio component;
display a user interface arrangement comprising a first display area including a rendering of the first stream and a second display area including a rendering the second stream;
detect an event that removes the video component from the first stream and retains the audio component of the first stream; and
in response to the event that removes the video component from the first stream and retains the audio component of the first stream,
replace the rendering of the first stream by
removing the rendering of the first stream from the first display area, and
rendering one or more streams of the plurality of streams in the first display area, the one or more streams including video and audio components.

9. The system of claim 8, wherein the first stream is provided by a client computing device to display the user interface arrangement comprising the first display area and the second display area.

10. The system of claim 8, wherein the one or more streams of the plurality of streams is the second stream, and in response to the event that removes the video component from the first stream, the computer executable instructions cause the one or more processing units to enlarge the second stream so that the second stream is rendered in the at least the portion of the first display area.

11. The system of claim 8, wherein the one or more streams of the plurality of streams rendered in the at least the portion of the first display area is a third stream of the plurality of streams.

12. The system of claim 8, wherein the computer executable instructions cause the one or more processing units to display the user interface arrangement comprising the plurality of display areas including the first display area, the second display area and an overflow display area including a rendering indicating a quantity of at least a plurality of the plurality of streams.

13. The system of claim 12, wherein the computer executable instructions cause the one or more processing units to remove the rendering indicating the quantity of the at least the plurality of the plurality of streams from the overflow display area, and render a third stream of the plurality of streams in the overflow display area.

14. The system of claim 8, wherein the event is at least one of: a user initiated event that removes the video component from the second stream; a server initiated event that removes the video component from the second stream; or a client computing device initiated event that removes the video component from the second stream.

15. A method, comprising:
transmitting teleconference data comprising a plurality of streams to at least one client computing device, the plurality of streams comprising at least a first stream and a second stream, each of the plurality of streams including at least a video and an audio component;
causing the at least one client computing device to display a user interface arrangement comprising a first display area including a rendering of the first stream and a second display area including a rendering the second stream;
detecting an event that removes a video component from the first stream, the first stream generated by an input device of the at least one client computing device; and
in response to detecting the event that removes the video component from the first stream, causing the at least one client computing device to,
replace the rendering of the first stream by
removing the rendering of the first stream from the first display area, and
rendering one or more streams of the plurality of streams in the first display area.

16. The method of claim 15, wherein the one or more streams of the plurality of streams is the second stream, and in response to the detecting the event that removes the video component from the first stream, causing the at least one client computing device to enlarge the second stream so that the second stream is rendered in the at least the portion of the first display area.

17. The method of claim 15, wherein the user interface arrangement further comprises a selectable interface element, wherein the method further comprises:
causing the at least one client computing device to display a second user interface arrangement in response to receiving a selection of the selectable interface element, the second user interface arrangement comprising a first display area including a description of one or more participants, the rendering of the first stream, and a rendering of a selected stream, the selected stream based on an activity level priority, wherein the second user interface arrangement further comprises a second selectable interface element; and causing the at least one client computing device to display the first user interface arrangement in response to receiving a selection of the second selectable interface element.

18. The method of claim 17, wherein the rendering of the first stream is removed in response to detecting an event that removes a video component from the first stream.

19. The method of claim 17, further comprising:

receiving a selection of a participant of the one or more participants; and causing the at least one client computing device to display a third user interface arrangement in response to receiving a selection of the participant, wherein the third user interface arrangement comprises contact information of the participant, wherein the third user interface arrangement further comprises a rendering of a first stream, and a rendering of the selected stream, wherein the third user interface arrangement further comprises a second selectable interface element for causing the display of the second user interface arrangement.

20. The method of claim 19, wherein the rendering of the first stream of the third user interface arrangement is removed in response to detecting the event that removes the video component from the first stream.

* * * * *